US012795249B2

(12) United States Patent
Park et al.

(10) Patent No.: US 12,795,249 B2
(45) Date of Patent: Nov. 10, 2026

(54) IMAGE SENSOR AND VEHICLE INCLUDING THE SAME

(71) Applicant: Samsung Electronics Co., Ltd., Suwon-si (KR)

(72) Inventors: Jiheon Park, Suwon-si (KR); Serin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 19/024,554

(22) Filed: Jan. 16, 2025

(65) Prior Publication Data

US 2026/0052231 A1 Feb. 19, 2026

(30) Foreign Application Priority Data

Aug. 13, 2024 (KR) ........................ 10-2024-0108570

(51) Int. Cl.
*H04N 23/80* (2023.01)
*G06F 11/10* (2006.01)
*G06F 11/263* (2006.01)

(52) U.S. Cl.
CPC ......... *H04N 23/80* (2023.01); *G06F 11/1004* (2013.01); *G06F 11/263* (2013.01)

(58) Field of Classification Search
None
See application file for complete search history.

(56) References Cited

U.S. PATENT DOCUMENTS

| | | | | |
|---|---|---|---|---|
| 9,075,110 | B2 | 7/2015 | Sato et al. | |
| 10,650,905 | B2 | 5/2020 | Iwao | |
| 10,678,176 | B2 | 6/2020 | Tomii et al. | |
| 10,953,662 | B2 | 3/2021 | Muramatsu | |
| 2005/0099447 | A1 | 5/2005 | Hsu et al. | |
| 2013/0205180 | A1 | 8/2013 | Sato et al. | |
| 2019/0041785 | A1 | 2/2019 | Tomii et al. | |
| 2019/0073278 | A1* | 3/2019 | Ikeda | G06T 9/007 |
| 2019/0198129 | A1 | 6/2019 | Iwao | |
| 2020/0180326 | A1 | 6/2020 | Muramatsu | |
| 2022/0101636 | A1 | 3/2022 | Hayashi | |
| 2023/0300487 | A1 | 9/2023 | Kawada | |
| 2025/0173234 | A1* | 5/2025 | Li | G06F 11/3041 |

* cited by examiner

*Primary Examiner* — Paul M Berardesca
(74) *Attorney, Agent, or Firm* — Fish & Richardson P.C.

(57) ABSTRACT

An image sensor includes: a pixel data generation circuit configured to convert a received optical signal into an electrical signal to transmit pixel data; a pattern data generation circuit configured to generate test pattern data based on the pixel data and that includes a plurality of data values and has a function characteristic that is defined by an arranged order of the plurality of data values in the test pattern data; an image signal processor configured to process the pixel data based on parameters that change in real time to generate image data, and to process the test pattern data based on the parameters to generate test pattern processed data; and a first detection circuit configured to detect whether the image signal processor is malfunctioning based on comparing the function characteristic of the test pattern data with a function characteristic of the test pattern processed data.

20 Claims, 19 Drawing Sheets

IMAGE SENSOR AND VEHICLE INCLUDING THE SAME

CROSS-REFERENCE TO RELATED APPLICATION

This application claims priority to and the benefit of Korean Patent Application No. 10-2024-0108570, filed in the Korean Intellectual Property Office on Aug. 13, 2024, the entire contents of which are incorporated herein by reference.

BACKGROUND

(a) Field

The present inventive concepts relate to image sensors and vehicles including the same.

(b) Description of Related Art

As in-vehicle image sensors become commercially available, vehicle-specific systems (e.g., automotive systems and methods) may operate according to one or more vehicle-related functional safety standards, including for example ISO 26262. To operate according to such one or more vehicle-related functional safety standards, automotive image sensors of a vehicle may support various safety mechanisms. For example, a vehicle may input a data test pattern having a constant value into an image sensor and check whether data having a corresponding constant value is output, in order to attempt to check whether a defect exists in the image sensor while the vehicle is driving.

SUMMARY

Some example embodiments provide an image sensor and/or a vehicle including the same, wherein the image sensor and/or the vehicle including the same are configured to detect whether there is a malfunction—for example, a defect in the image sensor—based on checking whether output data for test pattern data having a particular (or, in some example embodiments, predefined) and specific tendency has a corresponding tendency, identically to pixel data (e.g., whether the output data has a tendency corresponding to a tendency of the pixel data), even when data processing by an image signal processor is performed on input data that is affected by parameters including one or more of a temperature, a supply voltage, etc., which change in real time during an operation of the image signal processor. Accordingly, the image sensor and any vehicle including the same may be configured to identify the presence of defects in the image sensor with increased accuracy and/or precision. As a result, the image sensor and any vehicle including same may have improved operational performance, improved operational reliability, and/or improved safety based on being configured to perform accurate data processing on input data that accounts for the input data being potentially affected by factors such as a temperature and thereby potentially having data that differs from an intended value due to such defects. Such improved operational performance, improved operational reliability, and/or improved safety may include the image sensor and any vehicle including same having an improved ability to operate according to one or more vehicle-related functional safety standards, including for example ISO 26262, to thereby achieve a function safety goal and to thereby achieve improved operational performance, improved operational reliability, and/or improved safety associated with operation of the vehicle. Such improved operational performance, improved operational reliability, and/or improved safety associated with operation of a vehicle may include, for example, improved operational reliability and thus safety of autonomous navigation operations performed by a vehicle based on image data generated by the image sensor.

In some example embodiments of the present inventive concepts, an image sensor may include a pixel data generation circuit, a pattern data generation circuit, an image signal processor, and a first detection circuit. The pixel data generation circuit may be configured to convert a received optical signal into an electrical signal to transmit pixel data. The pattern data generation circuit may be configured to generate test pattern data based on the pixel data. The test pattern data may include a plurality of data values. The test pattern data may have a function characteristic defined by an arranged order of the plurality of data values in the test pattern data. The image signal processor may be configured to process the pixel data based on parameters that change in real time to generate image data, and to process the test pattern data based on the parameters to generate test pattern processed data. The first detection circuit may be configured to detect whether the image signal processor is malfunctioning based on comparing the function characteristic of the test pattern data with a function characteristic of the pattern processed data.

In some example embodiments of the present inventive concepts, an image sensor may include a pixel data generation circuit, a pattern data generation circuit, an image signal processor, a detection circuit, and an embedded line data generation circuit. The pixel data generation circuit may be configured to convert a received optical signal into an electrical signal to transmit pixel data. The pattern data generation circuit may be configured to generate test pattern data based on the pixel data. The test pattern data may include a plurality of data values. The test pattern data may have a function characteristic defined by an arranged order of the plurality of data values in the test pattern data. The image signal processor may be configured to process the pixel data based on parameters that change in real time to generate image data, and to process the test pattern data based on the parameters to generate test pattern processed data. The detection circuit may be configured to detect whether the image signal processor is malfunctioning based on the test pattern processed data received from the image signal processor. The embedded line data generation circuit may be configured to receive the image data and the test pattern processed data from the image signal processor, generate embedded header data and embedded footer data, and to transmit the image data, the test pattern processed data, the embedded header data, and the embedded footer data.

In some example embodiments of the present inventive concepts, a vehicle may include a pixel data generation circuit, a pattern data generation circuit, an image signal processor, a detection circuit, an embedded line data generation circuit, and an electronic control unit. The pixel data generation circuit may be configured to convert a received optical signal into an electrical signal to transmit pixel data. The pattern data generation circuit may be configured to generate test pattern data based on the pixel data. The test pattern data may include a plurality of data values. The test pattern data may have a function characteristic defined by an arranged order of the plurality of data values in the test pattern data. The image signal processor may be configured to process the pixel data based on parameters that change in real time to generate image data, and to process the test pattern data based on the parameters to generate test pattern processed data. The detection circuit may be configured to generate test pattern verification data indicating whether the function characteristic of the test pattern processed data received from the image signal processor satisfies a particular characteristic. The embedded line data generation circuit may be configured to generate embedded header data and embedded footer data, and to perform one of transmitting the embedded header data, the test pattern processed data, the image data, and the embedded footer data in a chronological order within a single frame, or transmitting the embedded header data, the image data, the test pattern processed data, and the embedded footer data in the chronological order. The electronic control unit may be configured to control an operation of the vehicle based on the test pattern verification data.

DETAILED DESCRIPTION

Figure 1:
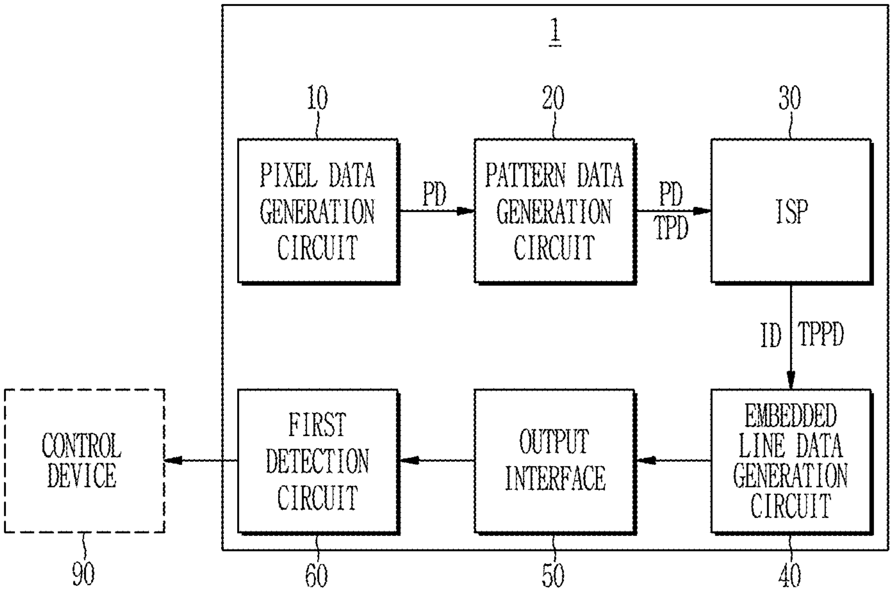
FIG. 1 illustrates a block diagram for describing an image sensor according to some example embodiments of the present inventive concepts.

In the following detailed description, some example embodiments of the present inventive concepts have been shown and described, by way of illustration. As those skilled in the art would realize, the example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various component and are not to be interpreted as limiting these components. These terms may be used for the purpose of distinguishing one constituent element from other constituent elements.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Hereinafter, the present inventive concepts will be described in more detail through examples. These examples are merely for illustrating the present inventive concepts, and the scope of right protection of the present inventive concepts is not limited by these examples.

FIG. 1 illustrates a block diagram for describing an image sensor according to some example embodiments of the present inventive concepts.

Referring to FIG. 1, the image sensor 1 may include a pixel data generation circuit 10, a pattern data generation circuit 20, an image signal processor (ISP) 30, an embedded line data generation circuit 40, an output interface 50, and a first detection circuit 60.

The pixel data generation circuit 10 may convert an optical signal received from an outside (e.g., incident light that is incident on the pixel data generation circuit from an external environment that is external to the image sensor 1) into an electrical signal, and may output pixel data PD. The pixel data generation circuit 10 may include a photoelectric element and various circuits for converting an optical signal into an electrical signal, and specific details will be described later with reference to FIG. 2.

Meanwhile, as illustrated in FIG. 1, the pixel data generation circuit 10 may output (e.g., transmit) pixel data PD to the pattern data generation circuit 20, and/or may also output the pixel data PD to the ISP 30.

The pattern data generation circuit 20 may generate test pattern data TPD including a plurality of data values. The pattern data generation circuit 20 may generate test pattern data TPD based on the pixel data PD. The pattern data generation circuit 20 may output (e.g., transmit) the generated test pattern data TPD to the ISP 30. The pattern data generation circuit 20 may receive the pixel data PD from the pixel data generation circuit 10, and may provide (e.g., transmit) one or both of the pixel data PD and the test pattern data TPD to the ISP 30.

The test pattern data TPD may have (e.g., may be associated with, may define, etc.) a particular (or, in some example embodiments, predefined) function characteristic. Herein, the function characteristic may indicate a characteristic of a function defined by each value of a plurality of data values for an order in which the data values included in the test pattern data TPD are arranged. The function characteristic may be defined by defined by an arranged order of the plurality of data values in (e.g., included in) the test pattern data. For example, the test pattern data TPD may be understood to include a plurality of data values that are arranged in a particular arranged order in the test pattern data TPD, where the arranged order of the plurality of data values in the test pattern data TPD defines a function characteristic of the test pattern data TPD. In some example embodiments, the pixel data PD includes pixel data values at particular addresses, and the test pattern data TPD is generated to include the pixel data values of the pixel data PD which are arranged (e.g., re-arranged) in corresponding addresses in a particular order (also referred to herein interchangeably as an arranged order) so that the arranged order of the pixel data values corresponding to the addresses of the test pattern data TPD defines a particular function characteristic that may be understood to be a function characteristic of the test pattern data TPD. Specific details will be described later with reference to FIGS. 4 to 7.

The ISP 30 may receive the pixel data PD and the test pattern data TPD from the pattern data generation circuit 20. In some example embodiments, the ISP 30 may receive the pixel data PD from the pixel data generation circuit 10 and may receive the test pattern data TPD from the pattern data generation circuit 20.

The ISP 30 may perform a processing operation on received data. The processing operation may include applying correction data based on various parameters that change in real time during operation of the ISP 30, including temperature changes, to the received data. The ISP 30 may generate image data ID by performing the processing operation on pixel data, and may generate test pattern processed data TPPD by performing the processing operation (e.g., the same processing operation as performed on the image data ID) on the test pattern data TPD. The ISP 30 may include various blocks implemented as hardware (e.g., a circuit) to perform the processing operation, and specific details will be described below with reference to FIG. 3.

The embedded line data generation circuit 40 may generate embedded header data and embedded footer data. The embedded header data and the embedded footer data may include data indicating whether the ISP 30 is malfunctioning, and specific details will be described later with reference to FIGS. 11 to 16.

The embedded line data generation circuit 40 may output (e.g., transmit) the image data and the test pattern processed data received from the ISP 30, together with the generated embedded header data and the embedded footer data, to the first detection circuit 60 through the output interface 50. The embedded line data generation circuit 40 may output (e.g., transmit) the generated embedded header data and embedded footer data, the image data, and the test pattern processed data in a particular (or, alternatively, predetermined) order, and specific details thereof will be described later with reference to FIGS. 8 to 10. The output interface 50 may output (e.g., transmit) data received from the embedded line data generation circuit 40 in units of a frame of image data.

The first detection circuit 60 may receive the test pattern processed data through the output interface 50. The first detection circuit 60 may detect whether the ISP 30 is malfunctioning by comparing a function characteristic of the test pattern data generated by the pattern data generation circuit 20 with a function characteristic of the received test pattern processed data. As described herein, a determination, detection, etc. that any portion of the image sensor 1 is malfunctioning, including for example a determination that at least the ISP 30 is malfunctioning, may be referred to herein interchangeably as a determination that the image sensor 1 is malfunctioning.

Meanwhile, in FIG. 1, the first detection circuit 60 is illustrated as being included within the image sensor 1, but example embodiments are not limited thereto, and the first detection circuit 60 may also be included in a host outside the image sensor 1. For example, the first detection circuit 60 may be included in an application processor (AP) or a system on chip (SoC) outside the image sensor 1 to detect whether the image sensor 1 is malfunctioning.

The first detection circuit 60 may transmit a status signal based on a determination at the first detection circuit 60 of whether the image sensor 1 is malfunctioning (e.g., whether any portion of the image sensor 1, including for example the ISP 30, is malfunctioning). The status signal may include information indicating whether the image sensor 1 is malfunctioning. As shown, the first detection circuit 60 may transmit the status signal to a control device 90 (e.g., controller, control device, etc.). The control device 90 may execute a control operation to control an operation of the image sensor 1 and/or an operation of one or more separate devices based on determining, based on processing the status signal, that the image sensor 1 is malfunctioning. The control operation may include controlling operation of the image sensor 1. The control operation may include controlling operation of a separate device that is separate from the image sensor and which may operate based on images generated by the image sensor.

Figure 19:
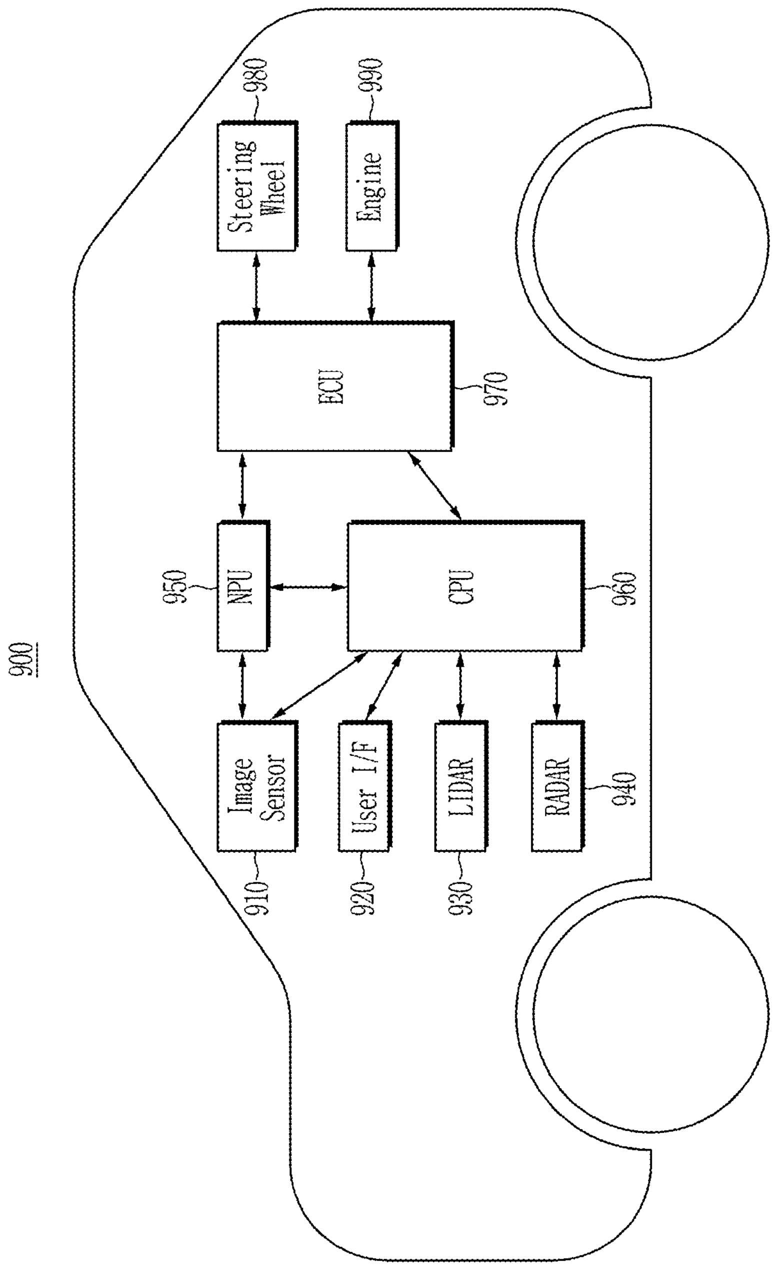
FIG. 19 illustrates a block diagram showing a vehicle according to some example embodiments of the present inventive concepts.

For example, in some example embodiments, the control device 90 may include and/or implement a CPU 960 or ECU 970 of a vehicle 900 as shown in FIG. 19, where the CPU 960 may control an overall operation of the vehicle 900 that is operating in an autonomous driving mode based at least in part upon images that are generated and transmitted by the image sensor 1 (e.g., image sensor 910 in FIG. 19). The control device 90 (e.g., the CPU 960 or ECU 970) may receive a status signal transmitted from the image sensor 1 (e.g., image sensor 910) based on the first detection circuit 60 detecting whether the image senor 1 is malfunctioning. In response to processing the status signal to determine that the image sensor 1 is malfunctioning, the control device 90 (e.g., CPU 960 or ECU 970) may perform a control operation to control one or more operations of the vehicle 900. For example, the control device 90 (e.g., CPU 960 or ECU 970) may perform a control operation to cause the vehicle 900 to exit the autonomous driving mode so as to immediately change from the autonomous driving mode to a manual driving mode by a driver, thereby ensuring user safety by preventing autonomous driving of the vehicle using a malfunctioning image sensor which may provide faulty image inputs and thus degrade autonomous driving performance of the vehicle. The control device 90 may further inhibit operation of the vehicle in autonomous driving mode in response to the determination that the image sensor 1 (e.g., image sensor 910) is malfunctioning, for example until the image sensor is determined to be reset, repaired, or replaced, thereby further improving safe operation of the vehicle by reducing, minimizing, or preventing the likelihood of autonomous driving of the vehicle using images generated by a malfunctioning image sensor.

The control operation may include generating, proving, and/or transmitting a warning signal to a user, maintenance service, or the like to provide a warning that the image sensor is malfunctioning. For example, in response to processing the status signal to determine that the image sensor 1 is malfunctioning, the control device 90 (e.g., CPU 960 or ECU 970) may transmit a warning signal to a user supported by the control device 90 that the image sensor 1 is malfunctioning and/or that operation of one or more devices is being controlled in a certain manner based on the determination that the image sensor 1 is malfunctioning. (e.g., display a visible indication and/or emit an audible signal via one or more interfaces of the vehicle 900 to alert a driver and/or passenger of the vehicle 900 that the vehicle is exiting autonomous driving mode). In another example, the control device 90 may, in response to determining that the image sensor 1 is malfunctioning, communicate with a remote service or system (e.g., via a communication network link) to schedule a maintenance appointment at a service location to repair a device that includes the image sensor 1 (e.g., vehicle 900), where such repair of the device may include repairing or replacing the image sensor 1. The control device 90 may cause a replacement image sensor 1 to be ordered to be delivered to the service location to enable replacement of the image sensor 1.

The control operation may include performing a repair operation on the image sensor 1 or any portion thereof (e.g., ISP 30). For example, the control device 90 may, in response to determining that the image sensor 1 is malfunctioning, perform a repair operation that includes performing a reset (e.g., reinitialization) of the image sensor 1 (e.g., turning the ISP 30 off and on again), performing a software reset and/or firmware reset of at least a portion of the image sensor 1 (e.g., performing a software reset and/or firmware reset of the circuitry and/or software program used to implement the ISP 30), any combination thereof, or the like, to attempt to correct the malfunction of the image sensor 1.

As a result of the control device 90 performing one or more control operations in response to the determination that the image sensor 1 is malfunctioning, where such a determination is based on the image sensor being configured to detect whether the image sensor 1 is malfunctioning (e.g., detect whether at least the ISP 30 is malfunctioning) based on generating the test pattern data TDP, operating the ISP 30 to process the pixel data and test pattern data TDP based on parameters that change in real time to generate image data and test pattern processed data, respectively, and detecting whether at least the ISP 30 is malfunctioning based on comparing a function characteristic of the test pattern data TDP (defined by an arranged order of the plurality of data values in the test pattern data) with a function characteristic of the test pattern processed data, an operational performance, operational reliability, and/or operational safety of a device (e.g., vehicle 900) may be improved.

Figure 2:
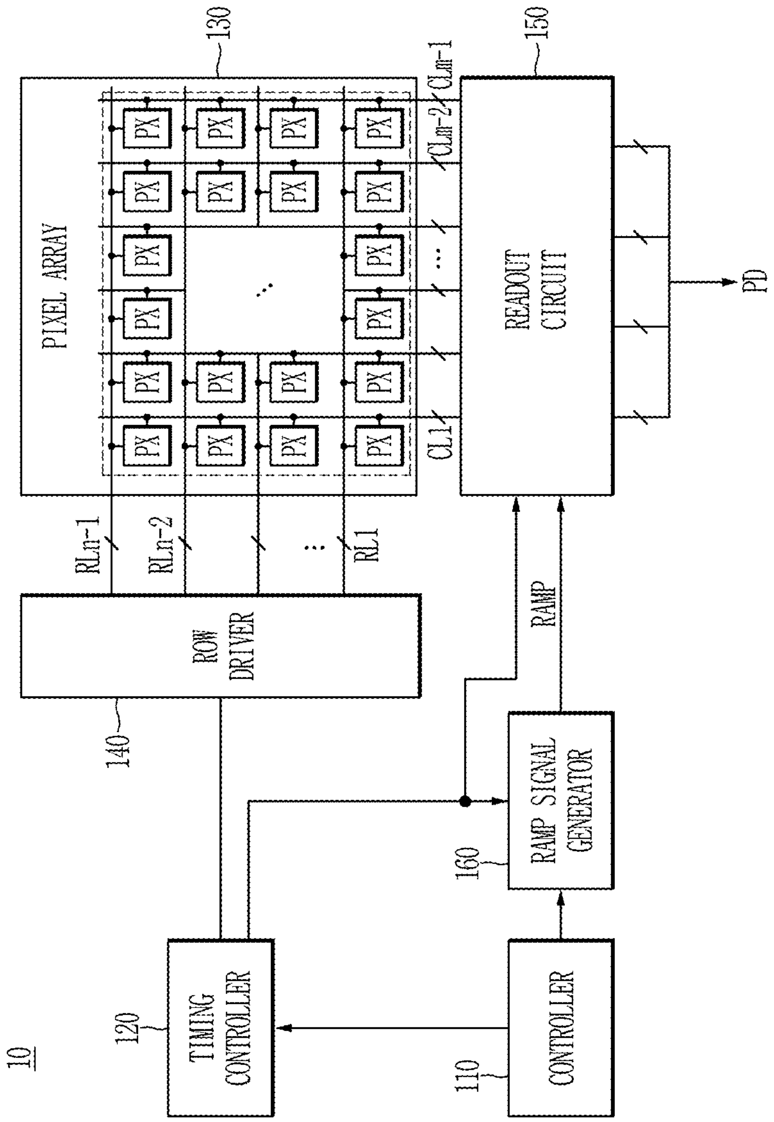
FIG. 2 illustrates a block diagram for describing a pixel data generation circuit according to some example embodiments of the present inventive concepts.

FIG. 2 illustrates a block diagram for describing a pixel data generation circuit according to some example embodiments of the present inventive concepts.

As illustrated in FIG. 2, the pixel data generation circuit 10 according to some example embodiments may include a controller 110, a timing controller 120, a pixel array 130, a row driver 140, a readout circuit 150, and a ramp signal generator 160.

The pixel data generation circuit 10 may convert an optical signal received from an outside (e.g., incident light that is incident on the pixel data generation circuit from an exterior of the image sensor 1) into an electrical signal, to output pixel data PD. The pixel data PD may be provided to the pattern data generation circuit 20 or the ISP 30 illustrated in FIG. 1 as described above.

The pixel data generation circuit 10 may be mounted on an electronic device having an image or light sensing function. For example, the pixel data generation circuit 10 may be mounted on an electronic device such as a camera, a smartphone, a wearable device, an Internet of things (IoT) devices, a home appliance, a tablet personal computer (PC), a personal digital assistant (PDA), a portable multimedia player (PMP), a navigation device, a drone, an advanced driver assistance system (ADAS), etc. In some example embodiments, the pixel data generation circuit 10 may be mounted on an electronic device provided as a part of a vehicle, a furniture, a manufacturing facility, a door, or various measuring devices.

The controller 110 may generally control each of the components 120, 130, 140, 150, and 160 included in the pixel data generation circuit 10. The controller 110 may also control operation timing of each of the components 120, 130, 140, 150, and 160 using control signals.

In some example embodiments, the controller 110 may control each of the components 120, 130, 140, 150, and 160 included in the pixel data generation circuit 10 to operate in an image sensing mode. The image sensing mode may be a mode in which the pixel data generation circuit 10 converts an optical signal received from the outside (e.g., incident light) into an electrical signal.

While the pixel data generation circuit 10 operates in the image sensing mode, the controller 110 may control the ramp signal generator 160 to adjust a reference signal RAMP generated by the ramp signal generator 160. While the pixel data generation circuit 10 operates in the image sensing mode, the controller 110 can control the timing controller 120 to adjust capacitance of floating diffusion (FD) of a pixel circuit in the pixel array 130 through the row driver 140.

The timing controller 120 may generate a signal that serves as a reference for operation timings of components of the pixel data generation circuit 10. The timing controller 120 may control the timings of the row driver 140, the readout circuit 150, and the ramp signal generator 160. The timing controller 120 may provide a control signal that controls the timings of the row driver 140, the readout circuit 150, and the ramp signal generator 160.

The pixel array 130 may include a plurality of pixels PX, and a plurality of row lines RL and a plurality of column lines CL respectively connected to the pixels PX. In some example embodiments, each of the pixels PX may include at least one photoelectric device (also referred to as a photosensing device). The photoelectric device may detect (e.g., absorb) incident light, and may convert the incident light into an electric signal according to an amount (e.g., intensity) of light, i.e., a plurality of analog pixel signals. A level (e.g., magnitude) of an analog pixel signal outputted (transmitted) from the photoelectric device may be increased as an amount of charge outputted from the photoelectric device increases. That is, the level of the analog pixel signal output from the photoelectric device may be increased as an amount (e.g., intensity) of light received into the pixel array 130 increases.

The plurality of row lines RL1 to RL(n−1) (RL), may extend in a first direction, and may be connected to the pixels PX positioned along the first direction, where "n" may be any positive integer. For example, the plurality of row lines RL may transmit a control signal outputted from the row driver 140 to an element, e.g., a transistor, provided in a pixel PX. In addition to the row lines RL, other signal lines may also be arranged in the first direction. A plurality of column lines CL1 to CL(m−1) (CL) may extend in a second direction intersecting the first direction, and may be connected to a plurality of pixels PX arranged along the second direction, where "m" may be any positive integer. The column lines CL may transmit pixel signals outputted from the pixels PX to the readout circuit 150.

In some example embodiments, one pixel PX may include a plurality of sub-pixel groups. The sub-pixel groups may be arranged in a form of M*N (M and N are integers greater than or equal to 2). The M*N form may be a form in which M items are arranged in an arrangement direction of the column lines CL and N items are arranged in an arrangement direction of the row lines RL.

The row driver 140 may generate a control signal for driving the pixel array 130 in response to a control signal of the timing controller 120, and control signals may be supplied to the plurality of pixels PX of the pixel array 130 through the plurality of row lines RL. In some example embodiments, the row driver 140 may control the pixels PX to sense light incident in a row line unit. The row line unit may include at least one row line RL.

In response to the control signal from the timing controller 120, the readout circuit 150 may convert pixel signals (or electric signals) from the pixels PX connected to the row line RL selected from among the plurality of pixels PX into pixel values representing an amount of light. The readout circuit 150 may convert the pixel signal outputted through the corresponding column line CL into a pixel value. For example, the readout circuit 150 may convert the pixel signal into the pixel value by comparing a ramp signal and the pixel signal. The pixel value may be data having multiple bits, and the readout circuit 150 may output (e.g., transmit) the pixel value as pixel data PD to the pattern data generation circuit 20 or the ISP 30 (or both the pattern data generation circuit 20 and the ISP 30) illustrated in FIG. 1. Specifically, the readout circuit 150 may include a selector, a plurality of comparators, a plurality of counter circuits, and the like.

The ramp signal generator 160 may generate the reference signal RAMP to transmit it to the readout circuit 150. The ramp signal generator 160 may include a current source, a resistor, and a capacitor. The ramp signal generator 160 may generate a plurality of ramp signals that fall or rise with a slope determined according to a current magnitude of a variable current source or a resistance value of a variable resistor by adjusting a ramp voltage, which is a voltage applied to ramp resistance, adjusting the current magnitude of the variable current source or the resistance value of the variable resistor.

Figure 3:
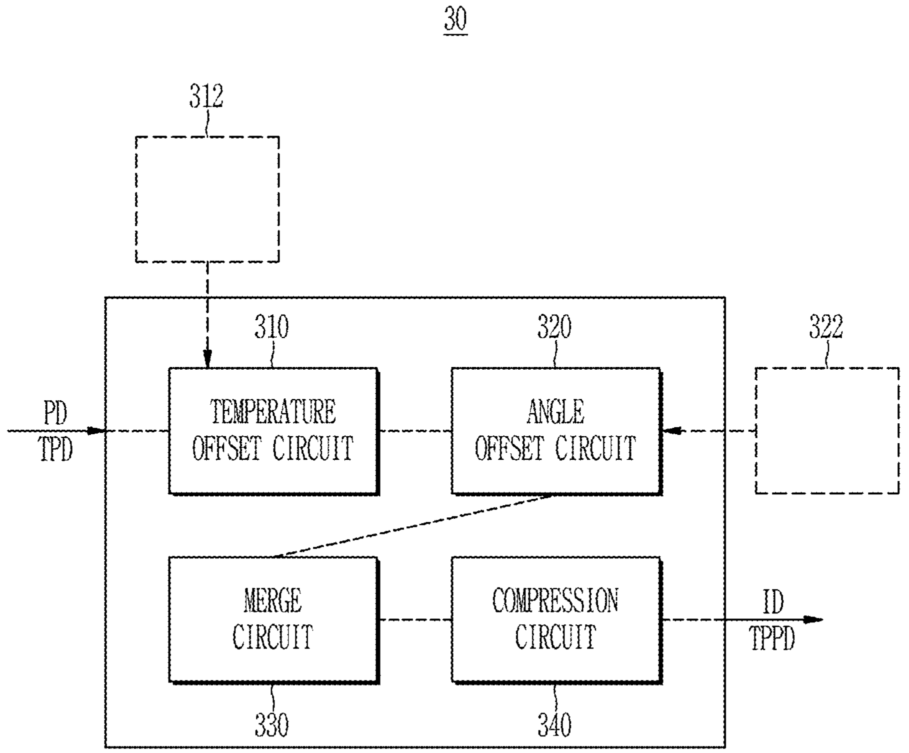
FIG. 3 illustrates a block diagram for describing an image signal processor according to some example embodiments of the present inventive concepts.

FIG. 3 illustrates a block diagram for describing an image signal processor according to some example embodiments of the present inventive concepts.

The ISP 30 may perform data processing on the pixel data PD received from the readout circuit 150 illustrated in FIG. 2. For example, the ISP 30 may receive a plurality of the pixel data PD from the readout circuit 150 illustrated in FIG. 2, and the ISP 30 may process the received pixel data PD to generate image data ID.

Furthermore, the ISP 30 may perform data processing on the test pattern data TPD received from the pattern data generation circuit 20 illustrated in FIG. 1. For example, the ISP 30 may receive a plurality of test pattern data TPD from the pattern data generation circuit 20 illustrated in FIG. 1, and may process the received test pattern data TPD to generate test pattern processed data TPPD.

The ISP 30 may include a plurality of circuits configured as hardware to process the pixel data PD and the test pattern data TPD based on parameters that may change in real time. Such parameters that may change in real time may include, for example, a temperature (e.g., a temperature associated with the image sensor 1), an incident angle of light (e.g., an incident angle of incident light that is incident on the pixel array 130 of the pixel data generation circuit 10), and/or a supply voltage (e.g., a magnitude of voltage applied to the pixel data generation circuit from a power supply). For example, the ISP 30 may include a temperature offset circuit 310, an angle offset circuit 320, a merge circuit 330, and a compression circuit 340.

The pixel data PD and the test pattern data TPD may be time-divided and inputted to the ISP 30 along a same path. The pixel data PD and the test pattern data TPD may be sequentially transmitted through a same path of the temperature offset circuit 310, the angle offset circuit 320, and the merge circuit 330, and the compression circuit 340, and data processing based on parameters that change in real time may be performed for each of the pixel data PD and the test pattern data TPD to generate the image data ID and the test pattern processed data TPPD, respectively.

The temperature offset circuit 310 may be a circuit for correcting shading on an image that occurs due to temperature changes or other reasons in a situation where an optical signal is not received. The angle offset circuit 320 may be a circuit for correcting brightness errors that occur depending on an incident angle of light. The merge circuit 330 may be a circuit for merging data acquired at various sensitivities. The compression circuit 340 may be a circuit for compressing data such that a bit width of the image is reduced.

Meanwhile, in FIG. 3, the ISP 30 is illustrated as including the temperature offset circuit 310, the angle offset circuit 320, the merge circuit 330, and the compression circuit 340, but example embodiments are not limited thereto, and the ISP 30 may further include various additional blocks or circuits depending on a function or operation thereof.

In addition, although it is illustrated that the pixel data PD and the test pattern data TPD are sequentially transmitted along the path of the temperature offset circuit 310, the angle offset circuit 320, the merge circuit 330, and the compression circuit 340 and data processing is performed, example embodiments are not limited thereto, and the data processing may be performed in a different order than the order for the pixel data PD and the test pattern data TPD. As shown, the temperature offset circuit 310 may receive temperature data (e.g., one or more ambient temperature values) from a temperature sensor 312 which may be any known temperature sensor and which may be included in the image sensor 1 or may be separate from the image sensor 1. The temperature offset circuit 310 may operate to correct errors in data due to temperature change based on the temperature data received from the temperature sensor 312. As shown, the angle offset circuit 320 may receive angle of incidence data from a light angle sensor 322, which may include any known light angle sensor and which may be included in the image sensor 1 (e.g., as part of the pixel data generator circuit 10) or may be separate from the image sensor 1. The angle offset circuit 320 may operate to correct errors in data due to angle of incidence of the incident light based on the angle of incidence data received from the light angle sensor 322.

Figure 4:
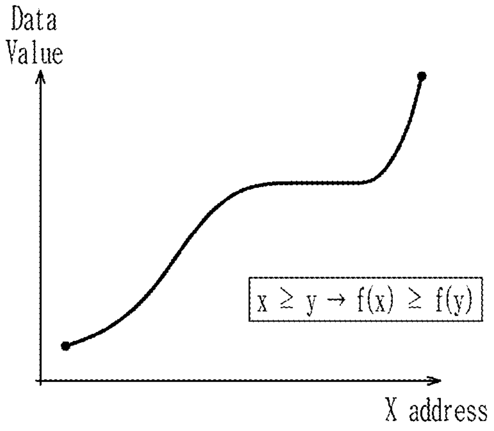
FIG. 4 illustrates a function characteristic of data processed by an image sensor according to some example embodiments of the present inventive concepts.
Figure 5:
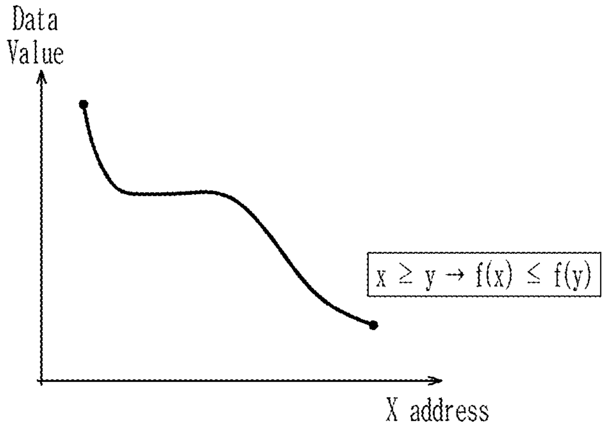
FIG. 5 illustrates a function characteristic of data processed by an image sensor according to some example embodiments of the present inventive concepts.

FIG. 4 and FIG. 5 each illustrate a function characteristic of data processed by an image sensor according to some example embodiments of the present inventive concepts.

Specifically, FIG. 4 shows a monotonically increasing function in which a data value increases as an X address increases, and FIG. 5 shows a monotonically decreasing function in which the data value decrease as the X address increases.

Herein, the X address may indicate an X-direction (e.g., a row direction in FIG. 2) address of test pattern data generated in the pattern data generation circuit 20. In some example embodiments, a plurality of data values included in the test pattern data may be arranged along the X-direction address.

Specifically, the test pattern data may include a plurality of data, and each of the plurality of data may have a data value expressed by a plurality of bits (e.g., 24 bits to 28 bits). Accordingly, the test pattern data may include a plurality of data values. Each data value of the plurality of data values may be independently expressed by a separate plurality of bits (e.g., 24 bits to 28 bits). In some example embodiments, the test pattern data is generated based on the pixel data such that the data values of the test pattern data are pixel data values of the pixel data that are arranged in a particular arranged order that defines a particular function characteristic. The function characteristic of the test pattern data may indicate a characteristic of a function defined by data values for X addresses of the plurality of data included in the pattern data. For example, the function characteristic of the test pattern data may indicate (e.g., may be, may be associated with, etc.) variation of data value Y as a function of X address of the data value, as defined by the data values of the plurality of data values of the test pattern data which are arranged in respective X addresses to define the function characteristic of the test pattern data.

For example, the pattern data generation circuit 20 may be configured to receive pixel data PD that includes a plurality of pixel data values, and the pattern data generation circuit 20 may generate test pattern data TPD based on arranging the pixel data values of the received pixel data PD to correspond to X addresses in a particular arranged order to cause the arrangement of pixel data values in corresponding X addresses to define a variation of pixel data value as a function of X addresses that conforms to (e.g., fits to, defines, etc.) a particular function and/or function characteristic. The pattern data generation circuit 20 may access a particular (e.g., predetermined) function characteristic (e.g., a monotonically increasing function characteristic) which may be stored in a memory or storage device of the image sensor 1 or a separate device that may include the image sensor 1. The pattern data generation circuit 20 may arrange the pixel data values of received pixel data PD in corresponding addresses of the test pattern data TPD via any known operation and/or algorithm (e.g., an arranging operation, a sorting operation, a regression operation, a curve fitting operation, any combination thereof, or the like) to cause the pixel data values to be arranged in a particular arranged order in the addresses of the test pattern data TPD that defines a variation of pixel data value with address that further defines the desired function characteristic (e.g., monotonically increasing pixel data values with X addresses of the pixel data values in the test pattern data). For example, the pattern data generation circuit 20 may generate test pattern data TDP having a monotonically increasing function characteristic based on arranging the pixel data values of received pixel data in corresponding X addresses in a particular order so that the pixel data values increase with increasing X address in the test pattern data TPS so as to define a particular (e.g., predetermined) function characteristic that is the monotonically increasing function characteristic of the test pattern data TPD. It will be understood that, in some example embodiments, the data values included in the test pattern data TPD are (or are based on) pixel data values included in the pixel data PD. Accordingly, data and/or data values included in the test pattern data TPD as described herein may be pixel data and/or pixel data values, respectively, of the pixel data PD and which may be arranged in a particular arranged order in corresponding addresses in the test pattern data TPD.

That is, FIG. 4 shows that as the X address of the test pattern data increases, the data value of the data at the corresponding X address of the test pattern data increases, so the function characteristic of the test pattern data may correspond to (e.g., may be defined by the data values of the data as a function of X address of the data to be) a monotonic increase, and FIG. 5 shows that as the X address of the test pattern data increases, the data value of the data at the corresponding X address of the test pattern data decreases, so the function characteristic of the test pattern data may correspond to (e.g., may be defined by the data values of the data as a function of X address of the data to be) a monotonic decrease.

Figure 6:
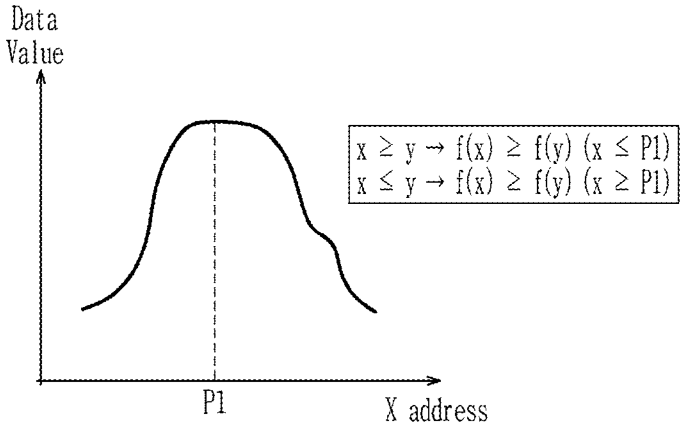
FIG. 6 illustrates a function characteristic of data processed by an image sensor according to some example embodiments of the present inventive concepts.
Figure 7:
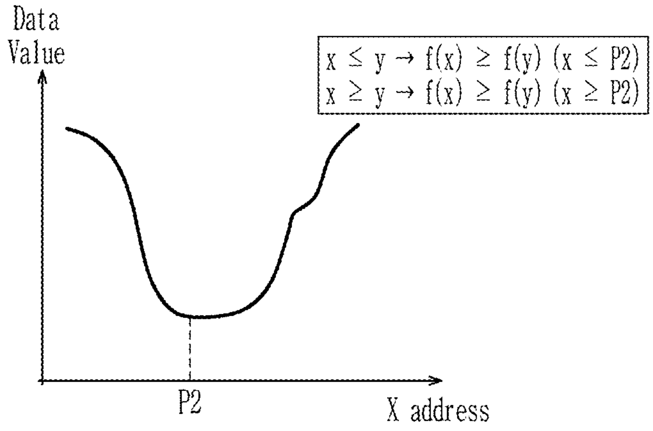
FIG. 7 illustrates a function characteristic of data processed by an image sensor according to some example embodiments of the present inventive concepts.

FIG. 6 and FIG. 7 each illustrate a function characteristic of data processed by an image sensor according to some example embodiments of the present inventive concepts.

Specifically, FIG. 6 shows that up to a point where the X address of the test pattern data is P1, the data value of the data at the corresponding X address of the test pattern data increases as the X address increases, so the function characteristic of the test pattern data in this section may correspond to the monotonic increase, and from the point where the X address of the test pattern data is P1, the data value of the data at the corresponding X address of the test pattern data decreases as the X address increases, so the function characteristic of the test pattern data in this section may correspond to the monotonic decrease.

On the other hand, FIG. 7 shows that up to a point where the X address of the test pattern data is P2, the data value of the data at the corresponding X address of the test pattern data decreases as the X address increases, so the function characteristic of the test pattern data in this section may correspond to the monotonic decrease, and from the point where the X address of the test pattern data is P2, the data value of the data at the corresponding X address of the test pattern data increases as the X address increases, so the function characteristic of the test pattern data in this section may correspond to the monotonic increase.

The first detection circuit 60 illustrated in FIG. 1 may detect whether the ISP 30 is malfunctioning by comparing the function characteristic of the test pattern data TPD with the function characteristic of the test pattern processed data TPPD processed from the ISP 30 (e.g., based on determining a difference or mismatch between such function characteristics).

For example, in some example embodiments, including the example embodiments shown in FIG. 4, the first detection circuit 60 may determine that the function characteristic of the test pattern data TPD is a monotonically increasing characteristic in which the data value of the data at the corresponding X address of the test pattern data increases as the X address increases. For example, referring to FIG. 4, the first detection circuit 60 may process the data values of data at some or all of the X addresses of the test pattern data TPD, fit a function of data value as a function of X address to the arrangement of data values corresponding to X addresses of the test pattern data TPD, and then analyze the function to identify the function as including (or being) a monotonically increasing function, to thereby define the function characteristic of the test pattern data TPD as a monotonically increasing characteristic, based on processing the data values and corresponding X addresses to determine that the data value of the data at the corresponding X address of the test pattern data TPD increases as the X address of the test pattern data TPD increases.

The first detection circuit 60 may determine whether the function characteristic of the test pattern processed data TPPD, which is generated by processing test pattern data TPD by ISP 30, is also the monotonically increasing characteristic in which the data value increases as the X address increases, corresponding to the test pattern data TPD. For example, still referring to FIG. 4, the first detection circuit 60 may process the data values of data at some or all of the X addresses of the test pattern processed data TPPD, fit a function of data value as a function of X address to the arrangement of data values corresponding to X addresses of the test pattern processed data TPPD, analyze the function to identify the function as including (or being) a monotonically increasing or decreasing function, to thereby define the function characteristic of the test pattern processed data TPPD as a monotonically increasing characteristic or a monotonically decreasing characteristic, based on processing the data values and corresponding X addresses to determine that the data value of the data at the corresponding X address of the test pattern processed data TPPD increases as the X address of the test pattern processed data TPPD increases, and then comparing the function characteristics of the test pattern data TPD and the test pattern processed data TPPD to determine whether the function characteristic of the test pattern processed data TPPD corresponds to (e.g., matches, is the same as, is the same within a certain margin, etc.) or is different from the function characteristic of the test pattern data TPD.

The first detection circuit 60 may determine that the ISP 30 is operating normally (and thus the image sensor 1 is operating normally) if (e.g., in response to a determination that) the function characteristic of the test pattern processed data TPPD has a monotonically increasing characteristic corresponding to (e.g., matches, is the same as, is the same within a certain margin, etc.) the function characteristic of the test pattern data TPD (e.g., referring to FIG. 4, determine that both function characteristics are a monotonically increasing characteristic). The first detection circuit 60 may determine that the ISP 30 is operating abnormally (e.g., is malfunctioning), and some example embodiments determine that image sensor 1 is malfunctioning, if (e.g., in response to a determination that) the function characteristic of the test pattern processed data TPPD has a characteristic that does not correspond to (e.g., is different from, does not match, etc.) the function characteristic of the test pattern data TPD (e.g., referring to FIG. 4, determine that the function characteristic of the test pattern processed data TPPD has a monotonically decreasing characteristic that is different from the monotonically increasing characteristic of the test pattern data TPD). In some example embodiments, including the example embodiments shown in FIG. 5, the first detection circuit 60 may perform a same or substantially a same operation, except that the function characteristic is opposite to that of the example embodiments shown in FIG. 4.

In some example embodiments, for example, in the example embodiments shown in FIG. 6, the first detection circuit 60 may determine that the function characteristic of the test pattern data TPD is a monotonically increasing characteristic in which the data value of the data at the corresponding X address of the test pattern data increases as the X address increases up to the data whose X address is P1, and a monotonically decreasing characteristic in which the data value of the data at the corresponding X address of the test pattern data decreases as the X address increases after the data whose X address is P1.

The first detection circuit 60 may determine whether the function characteristic of the test pattern processed data TPPD, which is generated by processing test pattern data TPD by ISP 30, is also the monotonically increasing characteristic in which the data value of the data at the corresponding X address of the test pattern processed data increases as the X address increases up to the processed data whose X address is P1 in the test pattern processed data TPPD, and then the data value of the data at the corresponding X address of the test pattern processed data decreases as the X address increases thereafter, corresponding to the function characteristic of the test pattern data TPD.

The first detection circuit 60 may determine that the ISP 30 is operating normally if (e.g., in response to a determination that) the function characteristic of the test pattern processed data TPPD has a characteristic corresponding to (e.g., matches, is the same as, is the same within a certain margin, etc.) the function characteristic of the test pattern data TPD, and may determine that the ISP 30 is operating abnormally (e.g., is malfunctioning) if (e.g., in response to a determination that) the function characteristic of the test pattern processed data TPPD has a characteristic that does not correspond to (e.g., is different from, does not match, etc.) the function characteristic of the test pattern data TPD. In some example embodiments, including the example embodiments shown in FIG. 7, the first detection circuit 60 may perform a same or substantially a same operation, except that the function characteristic is opposite to that of the example embodiments shown in FIG. 6.

An image sensor according to some example embodiments of the present inventive concepts may detect whether there is a malfunction inside the image sensor 1 (e.g., determine whether the ISP 30 is malfunctioning, and thus determine whether the image sensor 1 is malfunctioning) by determining whether test pattern processed data having a characteristic corresponding to (e.g., matching, the same as, similar within a certain margin, etc.) the function characteristic of the test pattern data is transmitted (e.g., transmitted from the ISP 30), by processing the test pattern data having the above-described function characteristic. Based on a determination of whether there is a malfunction inside the image sensor (e.g., a determination of whether the image sensor 1 is malfunctioning), the first detection circuit 60 may transmit a status signal (e.g., to control device 90) which indicates whether the image sensor 1 is malfunctioning, and the status signal may be used (e.g., by the control device 90) to control one or more operations, of the image sensor 1 and/or a separate device which may include the image sensor 1 and may utilize images generated by the image sensor 1 (e.g., vehicle 900), to thereby provide improved operational performance, operational reliability, and/or operational safety of the image sensor 1 and/or the separate device (e.g., vehicle 900).

Specifically, even if correction values based on parameters that change in real time by a plurality of circuits 310 to 340 included in the ISP 30 illustrated in FIG. 3 are applied to the test pattern data TPD, etc., the function characteristics of the test pattern processed data TPPD may be maintained, and test pattern processed data having corresponding function characteristics may be outputted. For example, the test pattern process data TPPD may be affected similarly by the parameters that change in real time as the test pattern data TPD, such that the function characteristic of the test pattern data TPD (e.g., monotonically increasing, monotonically decreasing, etc.) may remain the same in the test pattern processed data TPPD that is generated based on processing the test pattern data TPD when the ISP 30 is operating normally (e.g., is not malfunctioning).

Accordingly, malfunction detection method of an image sensor according to some example embodiments of the present inventive concepts may achieve improved coverage (e.g., improved accuracy and/or precision under a wider range of conditions which may be defined by one or more parameters that change in real time) compared to a conventional malfunction detection method of an image sensor that inputs a specific value into an image sensor and determines whether a corresponding specific value is outputted. Accordingly, an image sensor configured to detect whether the image signal processor is malfunctioning based on comparing the function characteristic of the test pattern data with a function characteristic of the test pattern processed data may be configured to enable improved operational reliability, operational performance, and/or operational safety based on having an improved ability to detect malfunctions over a wider range of conditions and, in some example embodiments, enable a control device 90 to perform one or more control operations in response to detection of such malfunctions. For example, the image sensor and any device including same (e.g., vehicle 900) may have improved operational performance, improved operational reliability, and/or improved safety based on being configured to perform accurate data processing on input data that accounts for the input data being potentially affected by parameters (also referred to herein interchangeably as factors) that change in real time such as a temperature and thereby potentially having data that differs from an intended value due to such defects, to thereby detect malfunctions with improved accuracy and/or precision and thereby enable control operations to be performed in response under a wider range of conditions. Such improved operational performance, improved operational reliability, and/or improved safety may include the image sensor and any vehicle including same having an improved ability to operate (e.g., perform one or more control operations based on operation of the control device 90) according to one or more vehicle-related functional safety standards, including for example ISO 26262, to thereby achieve a function safety goal and to thereby achieve improved operational performance, improved operational reliability, and/or improved safety associated with operation of the vehicle. Such improved operational performance, improved operational reliability, and/or improved safety associated with operation of a vehicle may include, for example, improved operational reliability and thus safety of autonomous navigation operations performed by a vehicle based on image data generated by the image sensor.

In addition, FIG. 4 illustrates a monotonically increasing function, FIG. 5 illustrates a monotonically decreasing function, FIG. 6 illustrates a function that monotonically increases and then monotonically decreases based on a specific point, and FIG. 7 illustrates a function that monotonically decreases and then monotonically increases based on a specific point, but the functional characteristics of the test pattern data are not necessarily limited to the example embodiments illustrated in FIGS. 4 to 7, and the functional characteristics of the test pattern data may vary according to some example embodiments.

Figure 8:
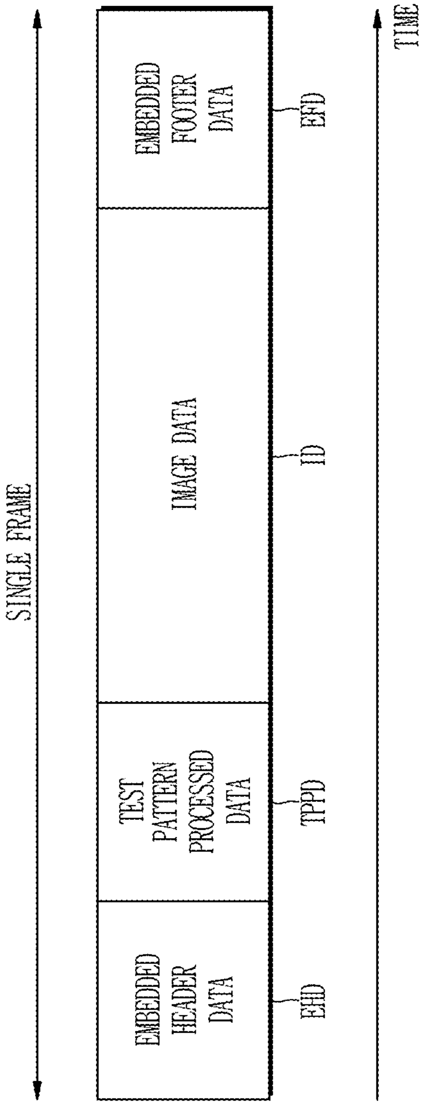
FIG. 8 illustrates an operation of an image sensor according to some example embodiments of the present inventive concepts.
Figure 9:
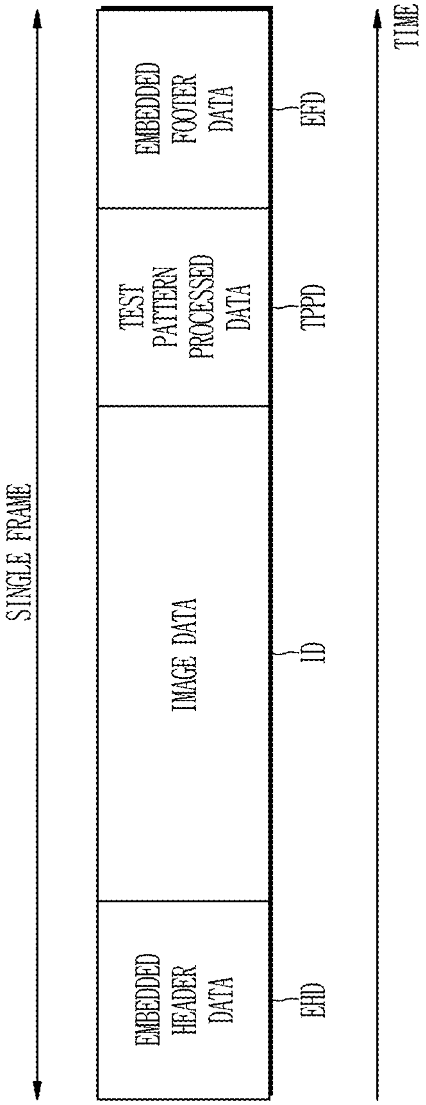
FIG. 9 illustrates an operation of an image sensor according to some example embodiments of the present inventive concepts.
Figure 10:
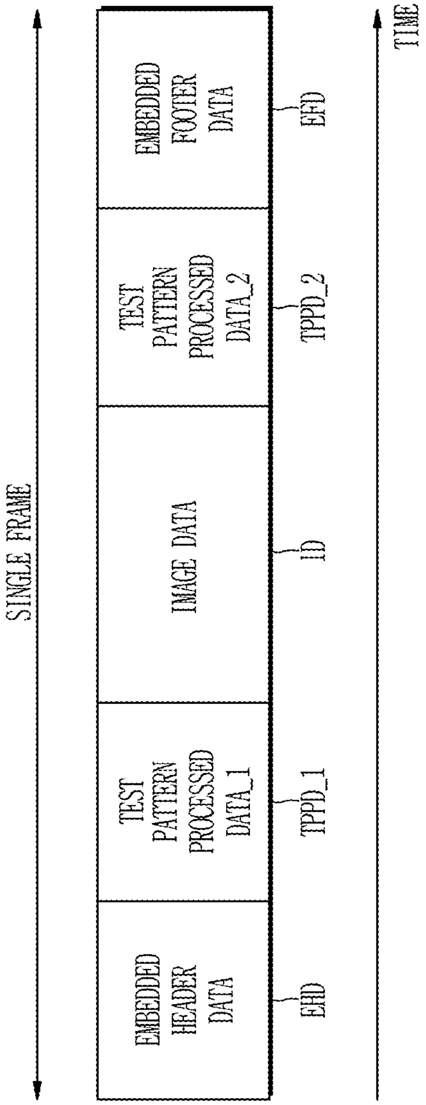
FIG. 10 illustrates an operation of an image sensor according to some example embodiments of the present inventive concepts.

FIG. 8, FIG. 9, and FIG. 10 illustrate an operation of an image sensor according to some example embodiments of the present inventive concepts.

Referring to FIG. 1 and FIG. 8 to FIG. 10, the embedded line data generation circuit 40 may generate embedded header data EHD and embedded footer data EFD, and may output (e.g., transmit) the test pattern processed data TPPD and the image data ID received from the ISP 30 together with the generated embedded header data EHD and embedded footer data EFD. The embedded line data generation circuit 40 may output the embedded header data EHD, the embedded footer data EFD, the test pattern processed data TPPD, and the image data ID arranged in a particular (or, alternatively, predetermined) order for each frame of the image data ID.

For example, referring to FIG. 8, the embedded line data generation circuit 40 may output (transmit) the embedded header data EHD, the test pattern processed data TPPD, the image data ID, and the embedded footer data EFD in a chronological order in a single frame according to a particular (or, alternatively, predetermined) order.

As another example, referring to FIG. 9, the embedded line data generation circuit 40 may also output the embedded header data EHD, the image data ID, the test pattern processed data TPPD, and the embedded footer data EFD in the chronological order in a single frame in a particular (or, alternatively, predetermined) order.

Meanwhile, in FIG. 8 and FIG. 9, the test pattern processed data TPPD may be shown as being output selectively between the embedded header data EHD and the image data ID, or between the image data ID and the embedded footer data EFD, but the example embodiments are not necessarily limited thereto.

For example, referring to FIG. 10, the embedded line data generation circuit 40 may also output (e.g., transmit) the embedded header data EHD, first test pattern processed data TPPD_1, the image data ID, second test pattern processed data TPPD_2, and the embedded footer data EFD in the chronological order in a single frame according to a particular (or, alternatively, predetermined) order.

That is, a number (e.g., quantity) of the test pattern processed data TPPD outputted within the single frame and an output order in a relationship with the embedded header data EHD, the image data ID, and the embedded footer data EFD may be changed at any time according to some example embodiments.

As described above, the image sensor according to some example embodiments of the present inventive concepts may generate and output not only image data but also test pattern processed data for each frame, so it may be possible to detect whether the image sensor is malfunctioning based on the test pattern processed data for each frame.

Figure 11:
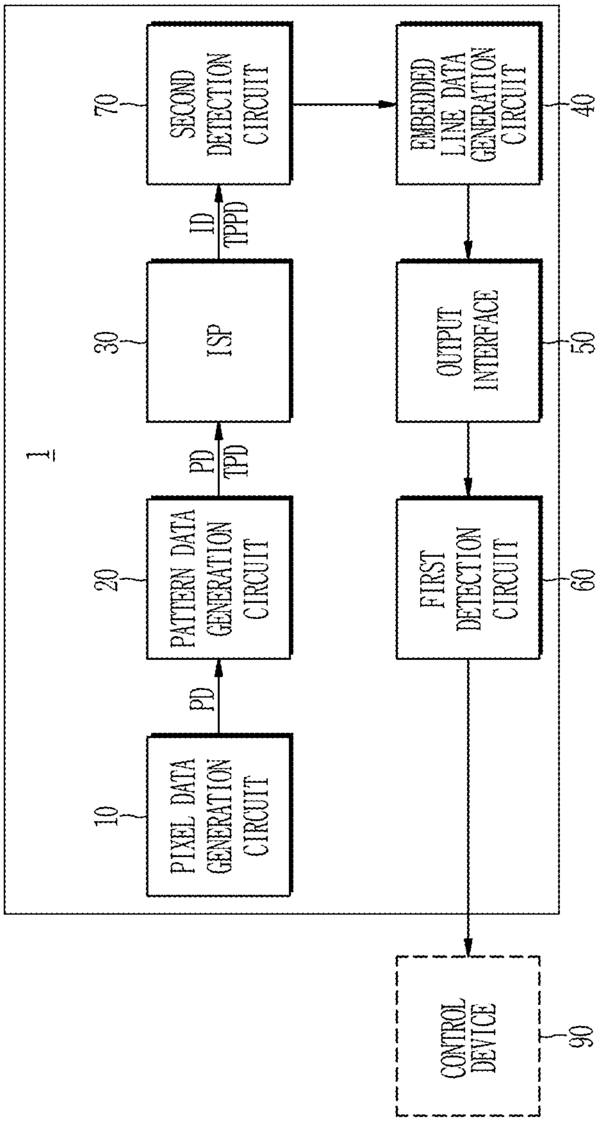
FIG. 11 illustrates a block diagram for describing an image sensor according to some example embodiments of the present inventive concepts.

FIG. 11 illustrates a block diagram for describing an image sensor according to some example embodiments of the present inventive concepts.

Referring to FIG. 11, the image sensor 1 may include a pixel data generation circuit 10, a pattern data generation circuit 20, an ISP 30, an embedded line data generation circuit 40, an output interface 50, a first detection circuit 60, and a second detection circuit 70. The example embodiments illustrated in FIG. 11 are example embodiments in which the second detection circuit 70 is added to the example embodiments illustrated in FIG. 1, and duplicate contents will be omitted and descriptions will focus on the differences.

The second detection circuit 70 may receive the test pattern processed data TPPD from the ISP 30. The second detection circuit 70 may detect whether the ISP 30 is malfunctioning based on the received test pattern processed data TPPD.

For example, the second detection circuit 70 may calculate a cyclic redundancy check (CRC) value for the test pattern processed data received from the ISP 30. The second detection circuit 70 may detect whether the ISP 30 is malfunctioning by comparing a particular (or, alternatively, predetermined) value (which may be stored in a memory that may be included in and/or accessed by the second detection circuit 70) with the calculated CRC value. The second detection circuit 70 may detect that the ISP 30 is malfunctioning (and thus the image sensor 1 is malfunctioning) in response to a determination that the calculated CRC value is different from the particular value. The second detection circuit 70 may detect that the ISP 30 is operating normally (and thus the image sensor 1 is operating normally) in response to a determination that the calculated CRC value is the same as the particular value. As described herein, an element operating normally will be understood to not be malfunctioning.

As another example, the second detection circuit 70 may determine whether a function characteristic of the test pattern processed data satisfies a particular (or, alternatively, predetermined) characteristic. For example, the second detection circuit 70 may determine whether the functional characteristic of the test pattern processed data is a particular at least one of monotonically increasing (e.g., FIG. 4) or monotonically decreasing (e.g., FIG. 5), and may detect whether the ISP 30 malfunctions based on determination thereof.

The second detection circuit 70 may generate test pattern verification data indicating whether the function characteristic of the test pattern processed data satisfies a particular (or, alternatively, predetermined) characteristic, and thereby may indicate whether the ISP 30 is malfunctioning. The second detection circuit 70 may provide the test pattern verification data to the embedded line data generation circuit 40.

The second detection circuit 70 may have a separate configuration from that of the first detection circuit 60. Specifically, in FIG. 11, the first detection circuit 60 is illustrated as being included in the image sensor 1, but as described with respect to FIG. 1, the first detection circuit 60 may be included in a host such as an AP outside the image sensor 1.

Accordingly, the second detection circuit 70 may detect whether the ISP 30 malfunctions inside the image sensor 1, the first detection circuit 60 may be included in the host to detect whether the image sensor 1 malfunctions (e.g., based on determining whether the ISP 30 is malfunctioning), and each of the malfunction detection operations of the first detection circuit 60 and the second detection circuit 70 may be performed independently of each other, which may enable improved malfunction-detection capability.

In some example embodiments, the test pattern verification data indicating whether the function characteristic of the test pattern processed data satisfies a particular (or, alternatively, predetermined) characteristic, and thereby indicating whether the ISP 30 (and thus the image sensor 1) is malfunctioning may be included in the status signal transmitted from the first detection circuit 60, where the status signal may include a separate indication of whether the image sensor 1 is malfunctioning based on a determination at the first detection circuit 60 of whether the ISP 30 (and thus the image sensor 1) is malfunctioning as described with reference to FIG. 1. Accordingly, the status signal transmitted from the first detection circuit 60 may include independent indications of whether the image sensor 1 (e.g., the ISP 30) is malfunctioning based on the separate (and in some example embodiments independent) operations of the first and second detection circuits 60 and 70. The control device 90 (e.g., a CPU or ECU of the vehicle 900 shown in FIG. 19) may process the status signal and may determine that the image sensor 1 is malfunctioning, and perform one or more control operations as described herein accordingly, in response to determining that either (or both) of the information generated by the first detection circuit 60 (e.g., based on determining whether the function characteristic of the test pattern processed data TPPD corresponds to the function characteristic of the test pattern data TPD) or the test pattern verification data generated by the second detection circuit 70 indicates that the image sensor 1 (e.g., at least the ISP 30) is malfunctioning. It will be understood that an indication or determination that any portion of the image sensor 1 is malfunctioning (e.g., the ISP 30 is malfunctioning) may be referred to interchangeably as an indication or determination that the image sensor 1 is malfunctioning.

FIG. 12, FIG. 13, FIG. 14, FIG. 15, and FIG. 16 illustrate an operation of an image sensor according to some example embodiments of the present inventive concepts.

Referring to FIG. 11 and FIGS. 12 to 16, the second detection circuit 70 may generate test pattern verification data TPVD. The embedded line data generation circuit 40 may receive the test pattern verification data TPVD from the second detection circuit 70 to generate embedded header data EHD or embedded footer data EFD including the test pattern verification data TPVD. In this case, the test pattern verification data TPVD may be represented in the form of a flag within the embedded header data EHD or the embedded footer data EFD.

Figure 12:
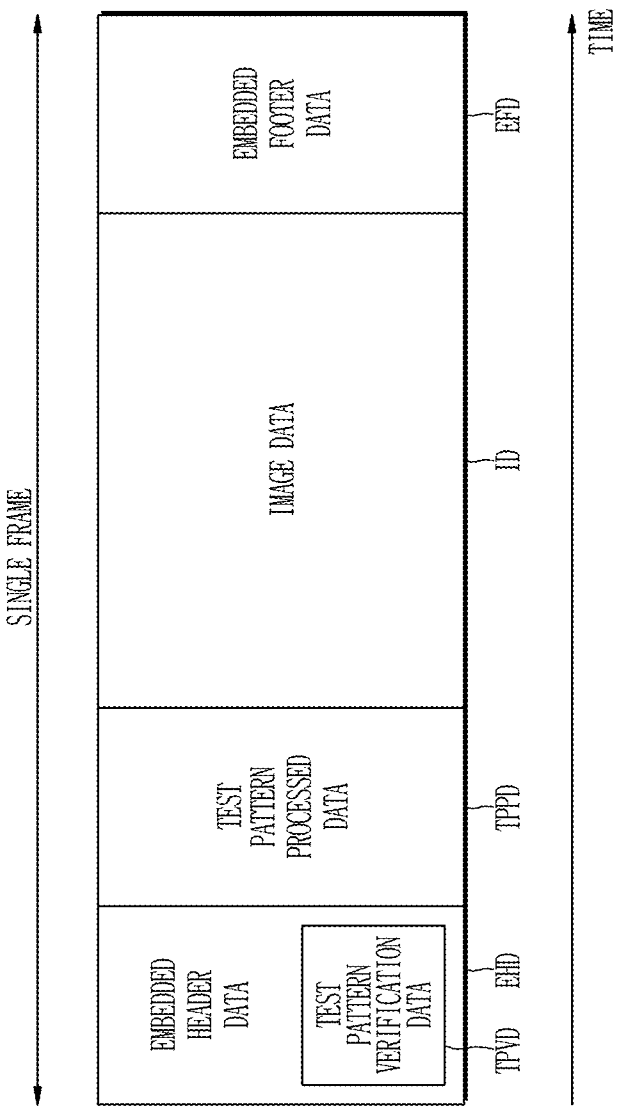
FIG. 12 illustrates an operation of an image sensor according to some example embodiments of the present inventive concepts.

For example, referring to FIG. 12, the embedded line data generation circuit 40 may generate the embedded header data EHD including test pattern verification data TPVD received from the second detection circuit 70, and may output the embedded header data EHD, the test pattern processed data TPPD, the image data ID, and the embedded footer data EFD in a chronological order in a single frame according to a particular (or, alternatively, predetermined) order.

Figure 13:
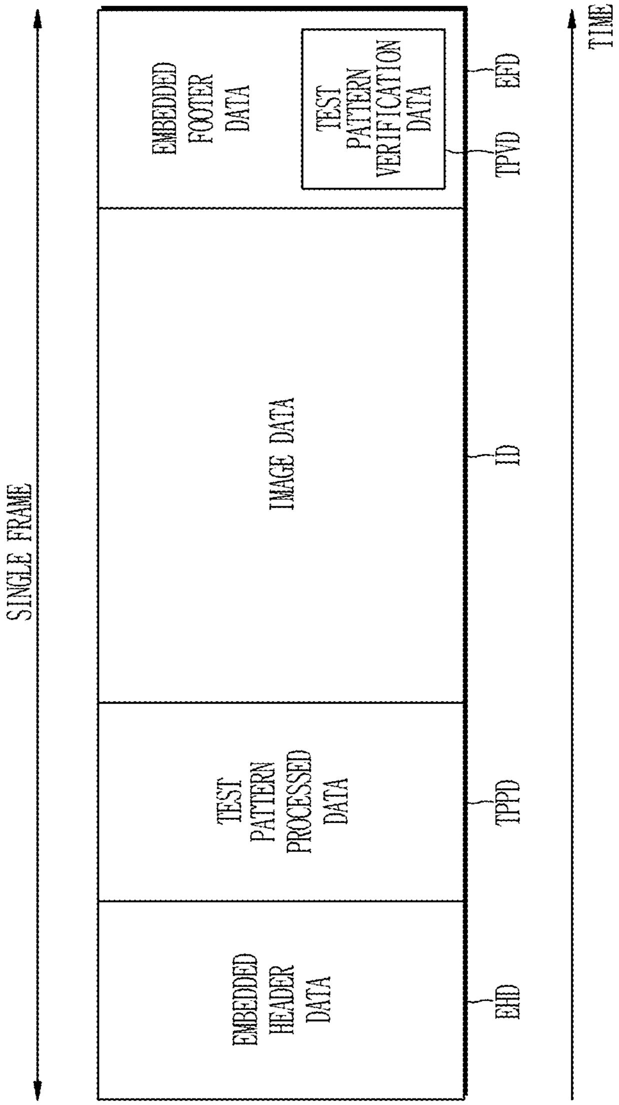
FIG. 13 illustrates an operation of an image sensor according to some example embodiments of the present inventive concepts.

As another example, referring to FIG. 13, the embedded line data generation circuit 40 may generate embedded footer data EFD including the test pattern verification data TPVD received from the second detection circuit 70, and may output the embedded header data EHD, the test pattern processed data TPPD, the image data ID, and the embedded footer data EFD in a chronological order in a single frame in a particular (or, alternatively, predetermined) order.

Figure 14:
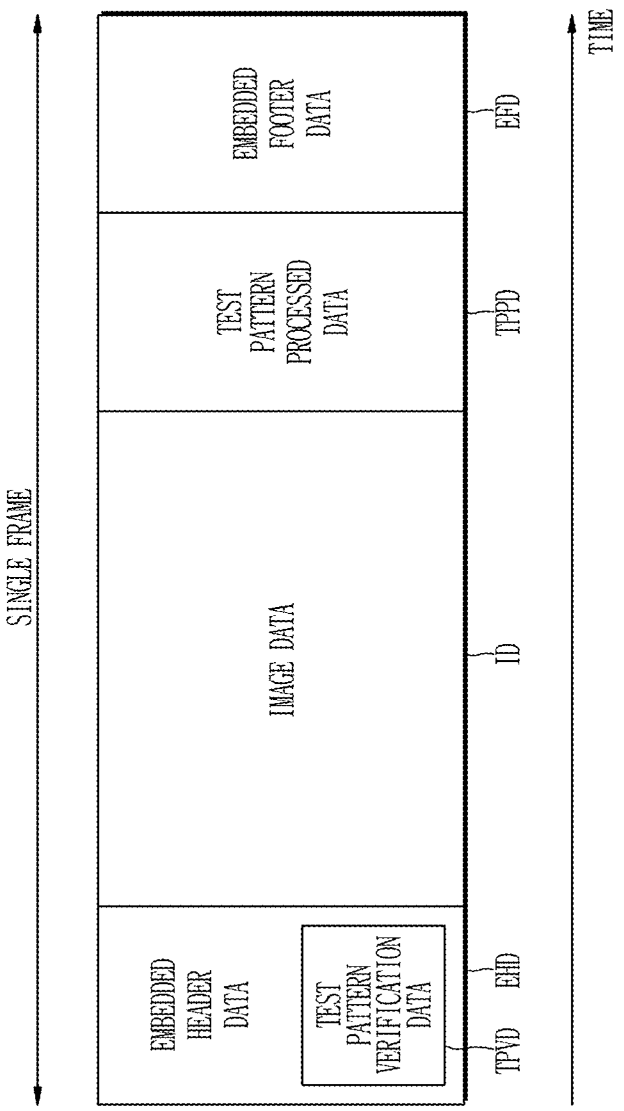
FIG. 14 illustrates an operation of an image sensor according to some example embodiments of the present inventive concepts.

As another example, referring to FIG. 14, the embedded line data generation circuit 40 may generate the embedded header data EHD including test pattern verification data TPVD received from the second detection circuit 70, and may output the embedded header data EHD, the image data ID, the test pattern processed data TPPD, and the embedded footer data EFD in the chronological order in a single frame according to a particular (or, alternatively, predetermined) order.

Figure 15:
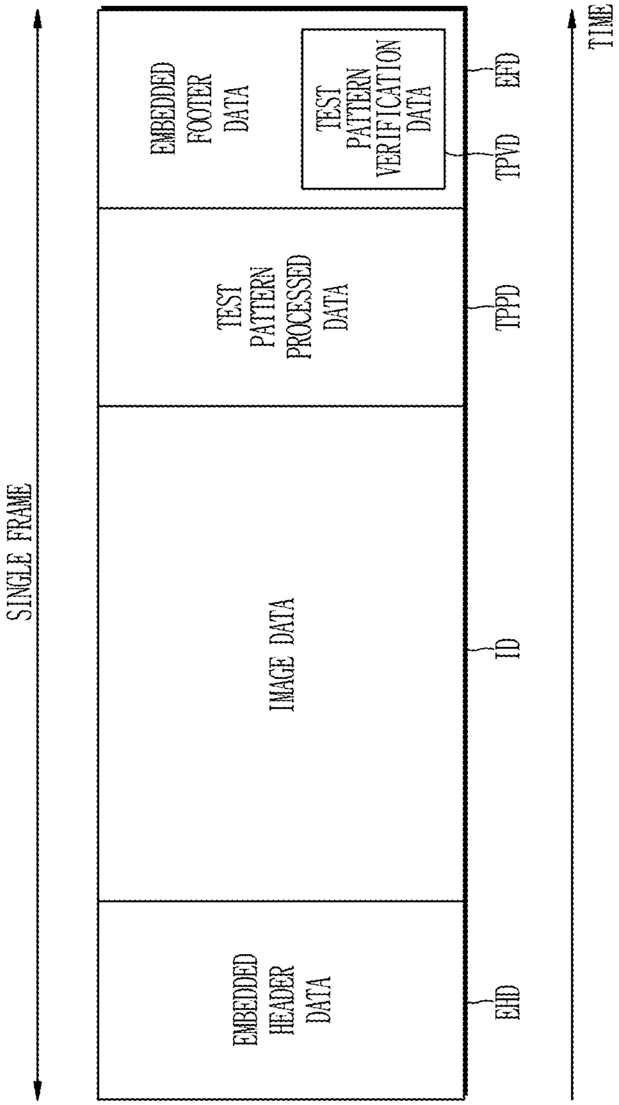
FIG. 15 illustrates an operation of an image sensor according to some example embodiments of the present inventive concepts.

As another example, referring to FIG. 15, the embedded line data generation circuit 40 may generate embedded footer data EFD including the test pattern verification data TPVD received from the second detection circuit 70, and may output the embedded header data EHD, the image data ID, the test pattern processed data TPPD, and the embedded footer data EFD in the chronological order in a single frame in a particular (or, alternatively, predetermined) order.

Meanwhile, in FIG. 12 and FIG. 15, the test pattern verification data TPVD may be selectively included in the embedded header data EHD or the embedded footer data EFD, and the test pattern processed data TPPD may be shown as being output selectively between the embedded header data EHD and the image data ID, or between the image data ID and the embedded footer data EFD, but the example embodiments are not necessarily limited thereto.

Figure 16:
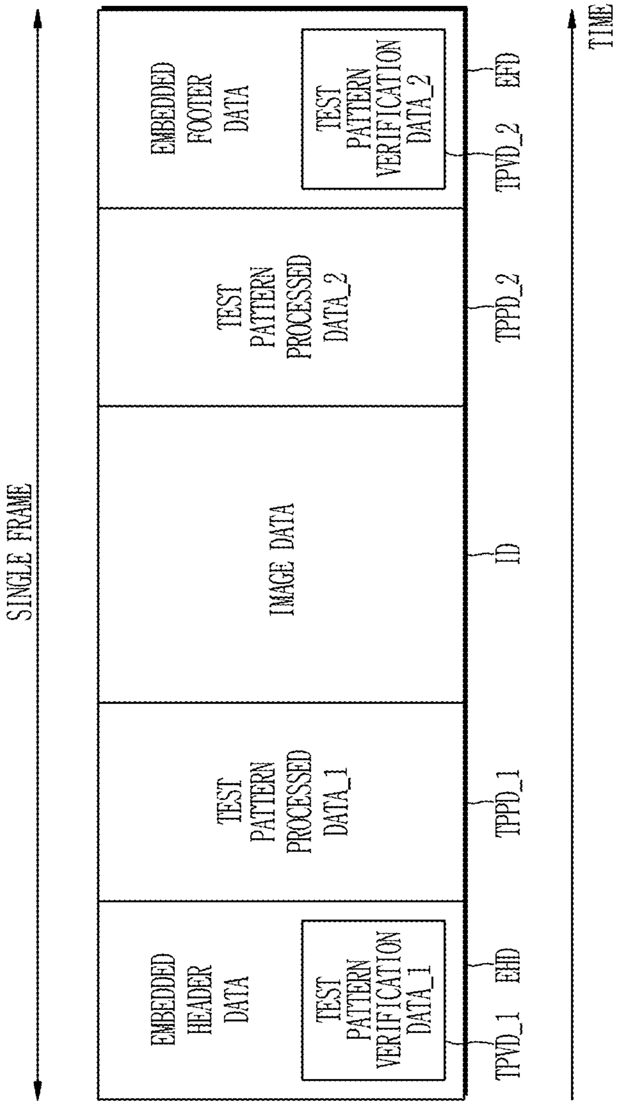
FIG. 16 illustrates an operation of an image sensor according to some example embodiments of the present inventive concepts.

For example, referring to FIG. 16, the embedded line data generation circuit 40 may also generate embedded header data EHD including first test pattern verification data TPVD_1 received from the second detection circuit 70, and embedded footer data EFD including second test pattern verification data TPVD_2 received from the second detection circuit 70, and may also output the embedded header data EHD, the first test pattern processed data TPPD_1, the image data ID, the second test pattern processed data TPPD_2, and the embedded footer data EFD in the chronological order in a single frame in a particular (or, alternatively, predetermined) order.

That is, numbers of the test pattern verification data TPVD and the test pattern processed data TPPD outputted within the single frame and an output order in a relationship with the embedded header data EHD, the image data ID, and the embedded footer data EFD may be changed at any time according to some example embodiments.

Figure 17:
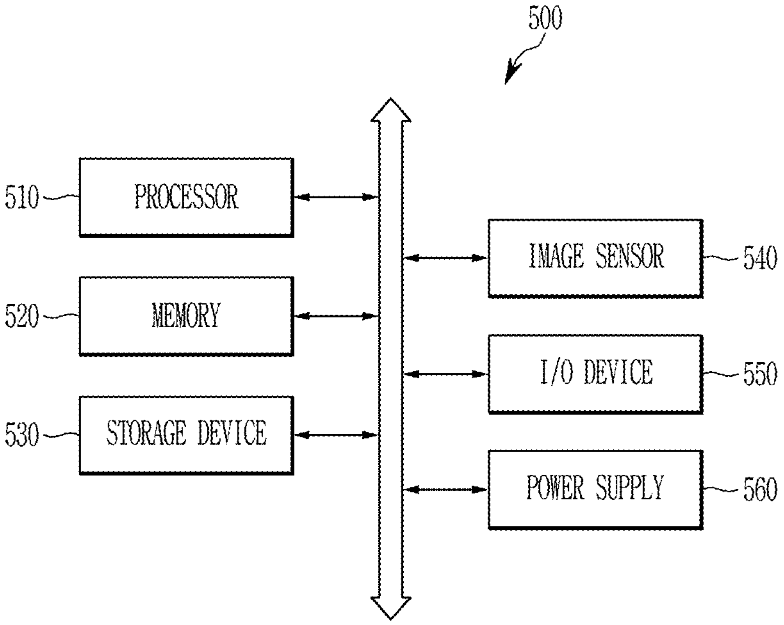
FIG. 17 illustrates a block diagram showing an electronic device according to some example embodiments of the present inventive concepts.

FIG. 17 illustrates a block diagram showing an electronic device according to some example embodiments of the present inventive concepts.

Referring to FIG. 17, the electronic device 500 may include a processor 510, a memory 520, a storage device 530, an image sensor 540, an input/output device 550, and a power supply 560, and these components may communicate with each other through a bus. Herein, the image sensor 540 may be the image sensor described with reference to FIGS. 1 through 16.

The processor 510 may perform specific calculations or tasks necessary for an operation of the electronic device 500. The memory 520 and storage device 530 may store data necessary for the operation of the electronic device 500.

For example, the processor 510 may include a microprocessor, a central processing unit (CPU), an application processor (AP), etc., the memory 520 may include a volatile memory and/or a non-volatile memory, and the storage device 530 may include a solid state drive (SSD), a hard disk drive (HDD), a CD-ROM, etc.

The input/output device 550 may include an input means such as a keyboard, a keypad, a mouse, etc., and an output means such as a printer, a display, etc. The power supply 560 may supply an operating voltage necessary for the operation of the electronic device 500.

Figure 18:
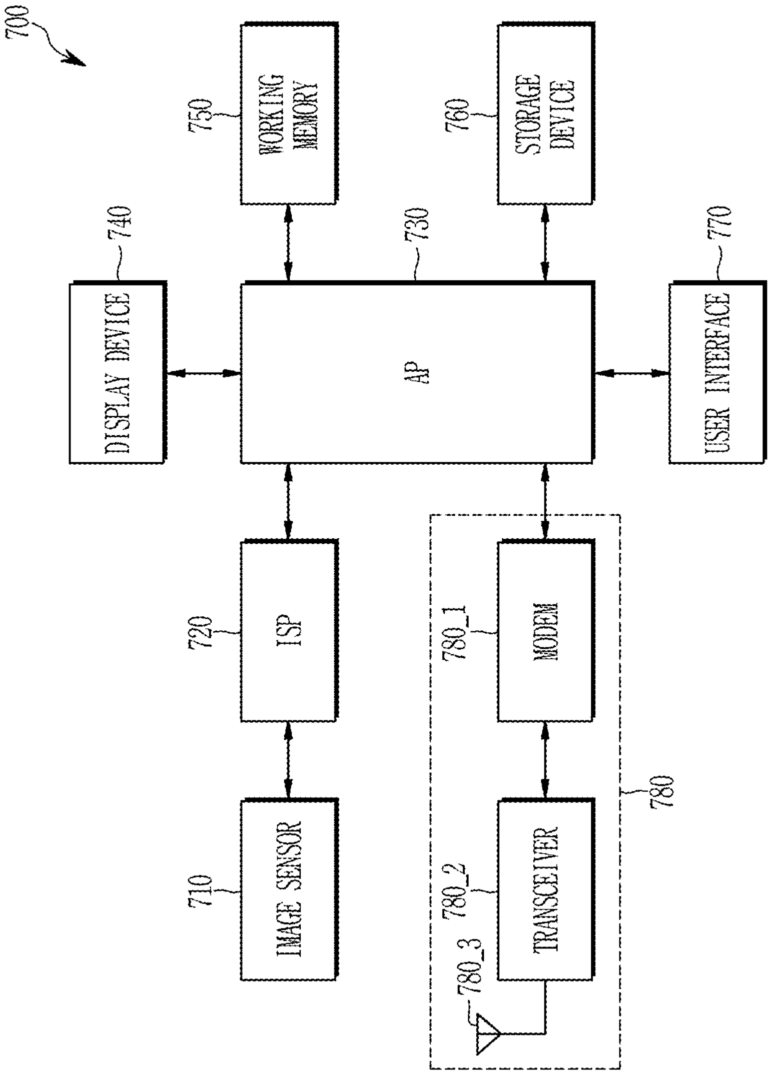
FIG. 18 illustrates a block diagram showing an electronic device according to some example embodiments of the present inventive concepts.

FIG. 18 illustrates a block diagram showing an electronic device according to some example embodiments of the present inventive concepts.

Referring to FIG. 18, an electronic device 700 according to some example embodiments may include an image sensor 710, an ISP 720, an application processor (AP) 730, a display device 740, a working memory 750, a storage device 760, a user interface 770, and a wireless transceiver 780. Herein, the image sensor 710 and the ISP 720 may be the image sensor and the ISP described in FIG. 1 referring to FIG. 16, respectively.

The image sensor 710 may generate image data, e.g., raw image data, based on a received optical signal, and may provide the image data to the ISP 720. The ISP 720 may perform image processing to change a data format of image data, which is digital data regarding an image, and image processing to improve image quality, such as noise removal, brightness adjustment, and sharpness adjustment.

In the present inventive concepts, the ISP 720 is described as being provided separately from the application processor 730 for better understanding and ease of description, but the example embodiments are not limited thereto. For example, the ISP 720 may not be configured as separate hardware or a combination of hardware and software, but may exist as a sub-component of the application processor 730.

The application processor 730 may control an overall operation of the electronic device 700, and may be provided as a system on chip (SoC) that runs applications, an operating system, etc. The application processor 730 may control an operation of the ISP 720, and may provide converted image data generated by the ISP 720 to the display device 740 or store it in the storage device 760.

The working memory 750 may store programs and/or data that the application processor 730 processes or executes. The storage device 760 may be implemented as a non-volatile memory device such as a NAND flash, a resistive memory, etc., and for example, the storage device (760) may be provided as a memory card (MMC, eMMC, SD, micro SD), etc. The storage device 760 may store data and/or programs for execution algorithms that control image processing operations of the ISP 720, and the data and/or programs may be loaded into the working memory 750 when the image processing operations are performed. For example, the working memory 750 or the storage device 760 may include a nonvolatile memory such as a read only memory (ROM), a flash memory, a phase-change RAM (PRAM), a magnetic RAM (MRAM), a resistive RAM (RRAM), a ferroelectric RAM (FRAM), etc., and may include a static RAM) or a dynamic RAM (DRAM) as a volatile memory, but they are not limited to the examples listed above.

The user interface 770 may be implemented with various devices capable of receiving a user input, such as a keyboard, a curtain key panel, a touch panel, a fingerprint sensor, and a microphone. The user interface 770 may receive a user input, and may provide a signal corresponding to the received user input to the application processor 730. The wireless transceiver 780 may include a modem 780_1, a transceiver 780_2, and an antenna 780_3.

FIG. 19 illustrates a block diagram showing a vehicle according to some example embodiments of the present inventive concepts.

As illustrated in FIG. 19, the vehicle 900 may include an image sensor 910, a user interface 920, a Light detection and ranging (LIDAR) sensor 930, a radio detection and ranging (RADAR) sensor 940, a neural processing unit (NPU) 950, a CPU 960, and an ECU 970, and the ECU 970 may receive a steering angle of the vehicle and a speed of the vehicle from a steering wheel 980 and an engine 990. In addition, although not shown, the vehicle 900 may further include a communication module, an input/output module, a security module, a power control device, etc., and may further include various types of control devices.

Herein, the image sensor 910 may be the image sensor 1 described with reference to FIGS. 1 through 16. At least one of the CPU 960 or the ECU 970 may be, may include, may be included in, may implement, or may be implemented by the control device 90 described with reference to FIGS. 1 through 16.

In some example embodiments, the vehicle 900 may detect objects using information related to an external environment acquired through sensors (e.g., the image sensor 910, the LIDAR sensor 930, and/or the RADAR sensor 940). The sensors 910, 930, and 940 may capture images of objects, may measure distances to the objects, and may transmit the images to processors (e.g., the NPU 950, the CPU 960, and the ECU 970) which may process the images to detect the objects and may implement an autonomous driving system operate the vehicle 900 in an autonomous driving mode to drive the vehicle in relation to the detected objects (e.g., drive the vehicle 900 to avoid collision with the detected objects). In order for the sensors 910, 930, and 940 to detect objects, in addition to the sensors mentioned, a time of flight (ToF) sensor, an ultrasonic sensor, an infrared sensor, a magnetic sensor, a position sensor (e.g., GPS), an acceleration sensor, a barometric pressure sensor, a temperature/humidity sensor (e.g., temperature sensor 312), a light angle sensor (e.g., light angle sensor 322), a proximity sensor, and/or a gyroscope sensor may also be used.

The image sensor 910 may provide image or light sensing, and may be, e.g., a complementary metal-oxide-semiconductor (CMOS) image sensor. The image sensor 910 may obtain image or visual information related to an object. For example, the image sensor 910 may be attached to a front of a vehicle to capture a driving image, or may measure a distance to an object positioned in front of the vehicle. A position where the image sensor 910 is attached is not limited thereto, and it may be attached to various positions to achieve an intended purpose of obtaining information related to the object.

The image sensor 910 may capture images of an environment surrounding the vehicle 900. The vehicle 900 may include at least two image sensors to capture 360-degree images around the vehicle. In some example embodiments, the image sensor 910 may also be equipped with a wide-angle lens. In some example embodiments, four image sensors for front, rear, left side, and right sides of the vehicle may be included in the vehicle 900, but the present inventive concepts are not limited thereto, and a single image sensor 910 may also be used to capture images of surroundings of the vehicle. The image sensor 910 may continuously provide information related to a surrounding environment of the vehicle to the vehicle 900 by continuously capturing images of the surrounding environment of the vehicle.

An image sensed by the image sensor 910 may be processed by the CPU 960 and/or the NPU 950. The CPU 960 may detect an object by processing a sensed image in a motion-based manner, and the NPU 950 may detect an object by processing the sensed image in a shape-based manner. The image sensor 910 may be attached to the front of the vehicle to sense an external environment in front of the vehicle, but the present inventive concepts are not limited thereto, and may be attached to various surfaces of the vehicle to sense the external environment. Herein, the image sensor 910 may be the image sensor described with reference to FIGS. 1 through 16.

The user interface 920 may include various electronic devices and mechanical devices included in a driver seat or a passenger seat, such as an instrument panel of the vehicle, a display showing driving information, a navigation system, and an air conditioning system.

The LIDAR sensor 930 may measure a distance to an object by emitting a laser pulse and receiving the laser reflected from the object. The LIDAR sensor 930 may typically include a laser, a scanner, a receiver, and a positioning system. Lasers generally use light with a wavelength of 600 to 1000 nm (nanometer), but this may vary depending on the application. The scanner may scan a sensed surrounding environment to quickly obtain information related to the surrounding environment, and there may be various types of scanners using a plurality of mirrors. The receiver may receive the laser pulse reflected from the target object, and may detect and amplify photons from the laser pulse. The positioning system may determine position coordinates and a direction of a device equipped with a receiver to implement a three-dimensional image. The LIDAR sensor 930 and the RADAR sensor 940 may be distinguished according to an effective measurement distance.

The RADAR sensor 940 may measure a distance to an object or identify the object by emitting electromagnetic waves and receiving the electromagnetic waves reflected from the target object, and may measure a position and a moving speed of the object. The RADAR sensor 940 may include a transmitter and a receiver. The transmitter may generate and output electromagnetic waves, and the receiver may receive echo waves reflected from the target object to process signals. The RADAR sensor 940 may perform transceiving through a single antenna, but the present inventive concepts is not limited thereto. A frequency band of electromagnetic waves used in the RADAR sensor 940 is a radio wave band or a microwave band, but may be changed depending on the purpose. In some example embodiments, the LIDAR sensor 930 and the RADAR sensor 940 may be attached to the vehicle to assist in determining a relative positional relationship between the vehicle and an object of interest. The RADAR sensor 940 may be divided into a long radar sensor and a short radar sensor.

The NPU 950 may receive input data, may perform calculations using an artificial neural network, and may provide output data based on a calculation result thereof. The NPU 950 may be a processor optimized for simultaneous matrix operations, may process multiple operations in real time, and may learn on its own based on accumulated data to derive optimal values. The NPU 950 may be optimized for simultaneous matrix operations to process multiple operations in real time, and may learn by itself based on accumulated data to derive a local-maximum in a current driving parameter.

In some example embodiments, the NPU 950 may be a processor specialized for performing deep-learning type of algorithms. For example, the NPU 950 may be a processor specialized for performing deep-learning algorithms. For example, the NPU 950 may process operations based on various types of networks, such as a convolution neural network (CNN), a region with convolution neural network (R-CNN), a region proposal network (RPN), a recurrent neural network (RNN), a fully convolutional network, a long short-term memory (LSTM) network, and a classification network. However, the present inventive concepts are not limited thereto, and various types of computational processing that simulate human neural networks are possible.

The NPU 950 may receive a driving image from the image sensor 910, and may perform shape-based object detection based on the driving image. The NPU 950 may distinguish each of multiple objects in a driving video by extracting features of the multiple objects and learning on its own based on accumulated data. For example, the NPU 950 may extract objects that serve as criteria for driving determination, such as vehicles, pedestrians, traffic lights, and lanes, from a single driving video based on features determined by using accumulated data as learning materials.

The CPU 960 may control an overall operation of the vehicle 900, including controlling operation of the vehicle 900 in an autonomous driving mode. The CPU 960 may include one processor core (Single Core) or multiple processor cores (Multi-Core). The CPU 960 may process or execute programs and/or data stored in a memory. For example, the CPU 960 may control functions of the NPU 950 and the ECU 970 by executing programs stored in the memory.

The CPU 960 may obtain a steering angle and a vehicle speed from the ECU 970. The steering angle may be determined by manipulation of the steering wheel 980 by a driver, and may be processed by the ECU 970 that controls an operation of a steering control device and provided to the CPU 960. A vehicle speed may be measured based on at least one of pedaling of a driver (e.g., an operation of an accelerator), a rotational speed of the engine 990, or a wheel speed measured by a wheel sensor, and may be processed by the ECU 970 that controls the vehicle speed and provided to the CPU 960.

Furthermore, the CPU 960 may determine a relative position relationship between the vehicle and a surrounding vehicle, may issue a command to maintain a number of rotation of the engine 990 for constant speed driving to maintain a certain distance from the surrounding vehicle according to a determined driving plan, and when a distance between the vehicle and the surrounding vehicle are below a threshold distance, or in a cut-in object situation of the surrounding vehicle, may issue a command to change the steering angle by adjusting the steering wheel 980 to left and right to perform an evasive maneuver. In FIG. 19, the steering wheel 980 and the engine 990 may be disclosed as configurations related to a steering angle and a vehicle speed, but the present inventive concepts are not limited thereto, and the steering angle and the vehicle speed may be determined through various vehicle components.

The CPU 960 may perform motion-based object detection in a driving image. Such a motion-based method may be a method that detects a degree of movement of an object over time and determine relative movement. The driving image may be acquired continuously for each frame through the image sensor 910. For example, each frame may be captured at a speed of 60 frames per second (fps), and thus the CPU 960 may detect movement over time between image frames acquired every 1/60 second. The motion-based method may include an optical flow, which refers to distribution of motion vectors of objects, etc.

In addition to the image sensor 910, the CPU 960 may also supplementally utilize a distance to an object obtained from the LIDAR sensor 930 and the RADAR sensor 940 to stably maintain a driving state of the vehicle (e.g., stably maintain driving of the vehicle 900 in an autonomous driving mode). Furthermore, the CPU 960 may issue a command to control a state of interior and exterior of the vehicle according to a manipulation of the user interface 920 by a driver.

The ECU 970 may be an electronic control device designed to control an overall operation or part of the operation of the vehicle. The ECU 970 may control an operation of the vehicle, such as an operation of a combustion engine, an operation of one or more electric motors, and an operation of a semi-automatic gearbox (SAGB) or an automatic gearbox (AGB), or other vehicle parameters under driver control, through a controller area network (CAN) multiplexing bus.

The ECU 970 may electronically control an engine of the vehicle, an actuator of a steering control device, a transmission control system, an anti-lock brake system, an airbag control system, etc. by a computer, may provide a speed of the vehicle to the vehicle 900 based on a rotation speed of the engine or a wheel speed measured by the wheel sensor, and may provide a steering angle of the vehicle to the vehicle 900 from the steering control device.

According to some example embodiments, the ECU 970 may control states of the steering wheel 980 and the engine 990 based on commands issued from the CPU 960 and the NPU 950. In some example embodiments, the ECU 970 may accelerate or decelerate the vehicle in response to commands issued from the CPU 960 and the NPU 950, and may provide a signal to the engine 990 to increase/decrease an engine rotation speed for acceleration/deceleration. Furthermore, the ECU 970 may change the steering wheel 980 left and right to perform an evasive maneuver when a distance from a surrounding vehicle is below a threshold distance or in a cut-in object situation of the surrounding vehicle according to a set driving plan.

According to some example embodiments of the present inventive concepts, the CPU 960 or ECU 970 may identify a fault in a lamp signal, and may cause the vehicle 900 to exit the autonomous driving mode. For example, the CPU 960 or ECU 970 may identify a fault in the lamp signal while driving in an autonomous driving mode based on the image sensor 910, and immediately change from the autonomous driving mode to a manual driving mode by a driver, thereby ensuring user safety. For example, the vehicle 900 may identify a fault in the lamp signal, and may stop a driving assistance function based on the lamp signal, thereby ensuring the safety of the driver or user.

According to some example embodiments of the present inventive concepts, the CPU 960 or ECU 970 (which may include, may implement, and/or may be implemented by the control device 90) may determine that the image sensor 910 or any portion thereof (e.g., an ISP 30) is malfunctioning, for example based on receiving a status signal from the image sensor 910 that indicates that the image sensor 910 is malfunctioning, and the CPU 960 or ECU 970 may cause the vehicle 900 to exit the autonomous driving mode in response. For example, the CPU 960 or ECU 970 may determine that the image sensor 910 or any portion thereof (e.g., an ISP 30) is malfunctioning while driving in an autonomous driving mode based on the image sensor 910, for example based on receiving a status signal from the image sensor 910 that indicates that the image sensor 910 is malfunctioning, and the CPU 960 or ECU 970 may immediately responsively change the vehicle 900 from operating in the autonomous driving mode to operating in a manual driving mode by a driver, thereby ensuring user safety. For example, the vehicle 900 (e.g., the CPU 960 or ECU 970) may determine that the image sensor 910 or any portion thereof (e.g., an ISP 30) is malfunctioning, and may stop a driving assistance function performed by the vehicle 900 based on the determination that the image sensor 910 or any portion thereof (e.g., an ISP 30) is malfunctioning, thereby ensuring the safety of the driver or user.

In some example embodiments, the CPU 960 or ECU 970 may execute a maintenance operation in response to determining that the image sensor 910 or any portion thereof (e.g., an ISP 30) is malfunctioning, for example based on receiving a malfunction signal from the image sensor 910. Such a maintenance operation may include attempting to reset, restart, or reinitialize the image sensor 910 or any portion thereof (e.g., restart, reset, etc. any program being executed by any circuitry in the image sensor). For example, the maintenance operation may include attempting to reset, restart or reinitialize the ISP 30 of the image sensor 910.

Although the ECU 970 is illustrated in the drawing as being installed in the vehicle separately from the CPU 960, the present inventive concepts is not limited thereto, and the vehicle control function of the ECU 970 may be performed together while being included within the CPU 960, and in this case, the CPU 960 may be understood to have at least two processor cores (Multi-core). In FIG. 19, the ECU 970 is illustrated as a separate configuration from the CPU 960, but the present inventive concepts are not limited thereto, and may exist within the CPU 960.

Although not shown in FIG. 19, the vehicle 900 may further include a communication module. The communication module may transmit data to an outside of the vehicle 900, or may receive data from the outside. For example, the communication module may communicate with an external object of the vehicle 900. In this case, the communication module may perform communication in a vehicle to everything (V2X) mode. For example, the communication module may perform communication in vehicle to vehicle (V2V), vehicle to infrastructure (V2I), vehicle to pedestrian (V2P), and vehicle to nomadic devices (V2N) modes. However, the present inventive concepts are not limited thereto, and the communication module may transmit and receive data by various known communication methods. For example, the communication module may perform communication by, e.g., 3G, 4G (LTE), 5G, Wi-Fi, Bluetooth, Bluetooth low energy (BLE), Zigbee, near field communication (NFC), ultrasonic communication, etc., and it may include both short-range communication and long-range communication.

As described herein, any devices, systems, modules, portions, units, blocks, controllers, circuits, and/or portions thereof according to any of the example embodiments, and/or any portions thereof (including, without limitation, the image sensor 1, the pixel data generation circuit 10, the pattern data generation circuit 20, the ISP 30, the embedded line data generation circuit 40, the output interface 50, the first detection circuit 60, the control device 90, the controller 110, the timing controller 120, the pixel array 130, the row driver 140, the readout circuit 150, the ramp signal generator 160, the temperature offset circuit 310, the temperature sensor 312, the angle offset circuit 320, the light angle sensor 322, the merge circuit 330, the compression circuit 340, the second detection circuit 70, the electronic device 500, the processor 510, the memory 520, the storage device 530, the image sensor 540, the input/output device 550, the power supply 560, the electronic device 700, the image sensor 710, the ISP 720, the application processor 730, the display device 740, the working memory 750, the storage device 760, the user interface 770, the wireless transceiver 780, the vehicle 900, the image sensor 910, the user interface 920, the Light detection and ranging (LIDAR) sensor 930, the radio detection and ranging (RADAR) sensor 940, the neural processing unit (NPU) 950, the CPU 960, the ECU 970, the steering wheel 980, the engine 990, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, blocks, controllers, circuits, and/or portions thereof according to any of the example embodiments.

While the inventive concepts have been described in connection with what is presently considered to be practical example embodiments, it is to be understood that the inventive concepts are not limited to such example embodiments, but, on the contrary, are intended to cover various modifications and equivalent dispositions included within the spirit and scope of the appended claims.

What is claimed is:

1. An image sensor, comprising:

a pixel data generation circuit configured to receive optical signal and transmit pixel data based on the optical signal;

a pattern data generation circuit configured to generate test pattern data based on the pixel data, the test pattern data including a plurality of data values, the test pattern data having a function characteristic defined by an arranged order of the plurality of data values in the test pattern data;

an image signal processor configured to process the pixel data based on parameters and generate image data, and process the test pattern data based on the parameters and generate test pattern processed data; and a first detection circuit configured to detect whether the image signal processor is malfunctioning based on comparing the function characteristic of the test pattern data with a function characteristic of the test pattern processed data.

2. The image sensor of claim 1, wherein the first detection circuit is configured to detect whether the image signal processor is malfunctioning based on performing at least one of determining whether the function characteristic of the test pattern processed data is a monotonic decrease corresponding to the test pattern data in response to a determination that the function characteristic of the test pattern data is a monotonic decrease, or determining whether the function characteristic of the test pattern processed data is a monotonic increase corresponding to the test pattern data in response to a determination that the function characteristic of the test pattern data is a monotonic increase.

3. The image sensor of claim 1, wherein the first detection circuit is configured to detect whether the image signal processor is malfunctioning based on performing at least one of determining, in response to a determination that the function characteristic of the test pattern data is monotonically increasing up to first data among the plurality of data values and monotonically decreasing from the first data onwards, whether the function characteristic of the test pattern processed data is monotonically increasing up to second data corresponding to the first data of the test pattern data and monotonically decreasing from the second data onwards, or determining, in response to a determination that the function characteristic of the test pattern data is monotonically decreasing up to third data among the plurality of data values and monotonically increasing from the third data onwards, whether the function characteristic of the test pattern processed data is monotonically decreasing up to fourth data corresponding to the third data of the test pattern data and monotonically increasing from the fourth data onwards.

4. The image sensor of claim 1, further comprising:

a second detection circuit configured to detect whether the image signal processor is malfunctioning based on the test pattern processed data received from the image signal processor.

5. The image sensor of claim 4, wherein the second detection circuit is configured to detect whether the image signal processor is malfunctioning based on determining whether the function characteristic of the test pattern processed data is at least one of a monotonic decrease or a monotonic increase.

6. The image sensor of claim 4, further comprising:

an embedded line data generation circuit configured to receive the image data and the test pattern processed data from the image signal processor, generate embedded header data and embedded footer data, and transmit the image data, the test pattern processed data, the embedded header data, and the embedded footer data to the first detection circuit.

7. The image sensor of claim 6, wherein the embedded line data generation circuit is configured to transmit the embedded header data, the test pattern processed data, the image data, and the embedded footer data in a chronological order within a single frame.

8. The image sensor of claim 7, wherein the second detection circuit is configured to generate test pattern verification data indicating whether the function characteristic of the test pattern processed data satisfies a particular characteristic, and the embedded header data includes the test pattern verification data.

9. The image sensor of claim 6, wherein the embedded line data generation circuit is configured to transmit the embedded header data, the image data, the test pattern processed data, and the embedded footer data in a chronological order within a single frame.

10. The image sensor of claim 9, wherein the second detection circuit is configured to generate test pattern verification data indicating whether the function characteristic of the test pattern processed data satisfies a particular characteristic, and the embedded footer data includes the test pattern verification data.

11. The image sensor of claim 4, wherein the second detection circuit is configured to detect whether the image signal processor is malfunctioning based on calculating a cyclic redundancy check (CRC) value for the test pattern processed data.

12. The image sensor of claim 1, wherein the image signal processor includes at least one of a temperature offset circuit configured to correct an error due to a temperature change, an angle offset circuit configured to correct an error due to an angle of incidence of incident light, a merge circuit configured to merge data, or a compression circuit configured to compress data, and at least one of the temperature offset circuit, the angle offset circuit, the merge circuit, or the compression circuit is configured to process the test pattern data having a monotonically decreasing function characteristic to transmit the test pattern processed data having a corresponding monotonically decreasing function characteristic, and to process the test pattern data having a monotonically increasing function characteristic to transmit the test pattern processed data having a corresponding monotonically increasing function characteristic.

13. An image sensor, comprising:

a pixel data generation circuit configured to receive optical signal and transmit pixel data based on the optical signal;

a pattern data generation circuit configured to generate test pattern data based on the pixel data, the test pattern data including a plurality of data values, the test pattern data having a function characteristic defined by an arranged order of the plurality of data values in the test pattern data;

an image signal processor configured to process the pixel data based on parameters and generate image data, and process the test pattern data based on the parameters and generate test pattern processed data;

a detection circuit configured to detect whether the image signal processor is malfunctioning based on the test pattern processed data received from the image signal processor; and an embedded line data generation circuit configured to receive the image data and the test pattern processed data from the image signal processor, generate embedded header data and embedded footer data, and transmit the image data, the test pattern processed data, the embedded header data, and the embedded footer data.

14. The image sensor of claim 13, wherein the embedded line data generation circuit is configured to transmit the embedded header data, the test pattern processed data, the image data, and the embedded footer data in a chronological order within a single frame.

15. The image sensor of claim 14, wherein the detection circuit is configured to generate test pattern verification data indicating whether the function characteristic of the test pattern processed data satisfies a particular characteristic, and the embedded header data includes the test pattern verification data.

16. The image sensor of claim 13, wherein the embedded line data generation circuit is configured to transmit the embedded header data, the image data, the test pattern processed data, and the embedded footer data in a chronological order within a single frame.

17. The image sensor of claim 16, wherein the detection circuit is configured to generate test pattern verification data indicating whether the function characteristic of the test pattern processed data satisfies a particular characteristic, and the embedded footer data includes the test pattern verification data.

18. The image sensor of claim 13, wherein the detection circuit is configured to detect whether the image signal processor is malfunctioning based on calculating a cyclic redundancy check (CRC) value for the test pattern processed data.

19. A vehicle, comprising:

a pixel data generation circuit configured to receive optical signal and transmit pixel data based on the optical signal;

a pattern data generation circuit configured to generate test pattern data based on the pixel data, the test pattern data including a plurality of data values, the test pattern data having a function characteristic defined by an arranged order of the plurality of data values in the test pattern data;

an image signal processor configured to process the pixel data based on parameters and generate image data, and process the test pattern data based on the parameters and generate test pattern processed data;

a detection circuit configured to generate test pattern verification data indicating whether the function characteristic of the test pattern processed data received from the image signal processor satisfies a particular characteristic;

an embedded line data generation circuit configured to generate embedded header data and embedded footer data, and to perform one of transmitting the embedded header data, the test pattern processed data, the image data, and the embedded footer data in a chronological order within a single frame, or transmitting the embedded header data, the image data, the test pattern processed data, and the embedded footer data in the chronological order; and an electronic control unit configured to control an operation of the vehicle based on the test pattern verification data.

20. The vehicle of claim 19, wherein the test pattern verification data is included in at least one of the embedded header data or the embedded footer data, and the test pattern verification data is represented in the at least one of the embedded header data or the embedded footer data in a form of a flag.

* * * * *